(12) United States Patent
Matiash

(10) Patent No.: US 7,208,698 B2
(45) Date of Patent: Apr. 24, 2007

(54) WELDING GUN ATTACHMENT MECHANISM

(75) Inventor: Nicholas A. Matiash, Oshkosh, WI (US)

(73) Assignee: Illinois Tool Works Inc., Glenview, IL (US)

( * ) Notice: Subject to any disclaimer, the term of this patent is extended or adjusted under 35 U.S.C. 154(b) by 195 days.

(21) Appl. No.: 11/050,946

(22) Filed: Feb. 4, 2005

(65) Prior Publication Data
US 2005/0224482 A1 Oct. 13, 2005

Related U.S. Application Data

(63) Continuation-in-part of application No. 10/820,996, filed on Apr. 8, 2004, and a continuation-in-part of application No. 10/820,997, filed on Apr. 8, 2004.

(51) Int. Cl.
*B23K 9/12* (2006.01)
*B65H 20/00* (2006.01)
*B65H 57/04* (2006.01)

(52) U.S. Cl. .................. 219/137.2; 226/187; 242/615.3

(58) Field of Classification Search ............. 219/137.2, 219/137.7; 226/177, 181, 186, 187; 242/615.3
See application file for complete search history.

(56) References Cited

U.S. PATENT DOCUMENTS

| 2,272,158 A | 2/1942 | Anderson |
| 2,754,958 A | 7/1956 | Murrell et al. |
| 2,904,168 A | 9/1959 | Wall et al. |
| 2,906,913 A | 9/1959 | Catlett |
| 3,016,451 A | 1/1962 | Cornell, Jr. |
| 3,046,438 A | 7/1962 | Elseth |
| 3,279,669 A | 10/1966 | Bernard et al. |
| 3,331,545 A | 7/1967 | Olivieri |
| 3,344,305 A | 9/1967 | Ogden |
| 3,430,832 A | 3/1969 | Meyer |
| 3,447,305 A | 6/1969 | Stahlecker et al. |
| 3,447,730 A | 6/1969 | Jeannette |
| 3,629,547 A | 12/1971 | Kester et al. |

(Continued)

FOREIGN PATENT DOCUMENTS

DE 29920277 U1 1/2000

(Continued)

OTHER PUBLICATIONS

Miller Electric Mfg. Co., S-52A, S-54A Owner's Manual, Oct. 1991, 40 pgs., USA.

(Continued)

*Primary Examiner*—Kevin P. Kerns
(74) *Attorney, Agent, or Firm*—Wilhelm Law Service, S.C.; Eric J. Lalor

(57) ABSTRACT

A power block for holding a welding gun power pin has a receiving structure which defines a bore which receives and holds a welding gun power pin. The power block further includes a projection movable between at least a first position and a second position. When the projection is in the first position, the projection extends at least partially into the receiving structure cavity. When the projection is in the second position, the projection generally does not extend into the receiving structure cavity. In some embodiments, the projection has a generally straight line distal edge. In other embodiments, the projection has a generally arcuate distal edge.

25 Claims, 17 Drawing Sheets

U.S. PATENT DOCUMENTS

| | | | |
|---|---|---|---|
| 3,675,837 A | 7/1972 | Gerould | |
| 3,847,287 A | 11/1974 | Dinse | |
| 3,901,425 A | 8/1975 | Taylor et al. | |
| 4,068,106 A | 1/1978 | Shaputis | |
| 4,143,257 A | 3/1979 | Herrmann | |
| 4,160,151 A | 7/1979 | Tonita | |
| 4,165,829 A | 8/1979 | Koveshnikov et al. | |
| 4,177,912 A | 12/1979 | Samokovliski et al. | |
| 4,206,862 A | 6/1980 | DaCosta | |
| 4,210,796 A | 7/1980 | Moerke | |
| 4,261,499 A | 4/1981 | Samokovliski et al. | |
| 4,261,500 A | 4/1981 | Samokovliski et al. | |
| 4,344,553 A | 8/1982 | Lesher et al. | |
| 4,429,820 A | 2/1984 | Angelov et al. | |
| 4,442,334 A | 4/1984 | Lux et al. | |
| 4,549,068 A | 10/1985 | Kensrue | |
| 4,600,824 A | 7/1986 | Moerke | |
| 4,650,959 A | 3/1987 | Swensrud et al. | |
| 4,695,702 A | 9/1987 | Gartland | |
| 4,845,336 A | 7/1989 | Samokovliiski et al. | |
| 4,864,099 A | 9/1989 | Cusick, III et al. | |
| 5,338,917 A | 8/1994 | Stuart et al. | |
| 5,738,264 A | 4/1998 | Jackson et al. | |
| 5,816,466 A | 10/1998 | Seufer | |
| 6,066,833 A * | 5/2000 | Rigdon et al. | 219/137.2 |
| 6,257,517 B1 | 7/2001 | Babish et al. | |
| 6,318,614 B1 | 11/2001 | Boyd | |
| 6,365,867 B1 | 4/2002 | Hooper | |
| 6,388,234 B1 | 5/2002 | Collins et al. | |
| 6,427,894 B1 | 8/2002 | Blank et al. | |
| 6,525,297 B2 | 2/2003 | Doherty | |
| 6,536,644 B2 | 3/2003 | Plow | |
| 6,557,742 B1 | 5/2003 | Bobeczko et al. | |
| 6,568,578 B1 | 5/2003 | Kensrue | |
| 6,903,305 B2 | 6/2005 | Mukai et al. | |
| 7,026,574 B2 | 4/2006 | Belfiore et al. | |
| 2005/0006425 A1 | 1/2005 | Enyedy | |

FOREIGN PATENT DOCUMENTS

WO  WO 01/66297  9/2001

OTHER PUBLICATIONS

Miller Electric Mfg. Co., 22A, 24A Owner's Manual, Oct. 2003, 28 pgs., USA.

Miller Electric Mfg., S-74DX Owner's Manual, Nov. 2003, 40 pgs., USA.

* cited by examiner

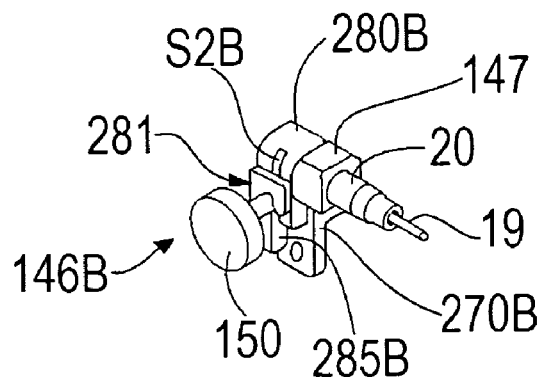
FIG. 6B
FIG. 6C
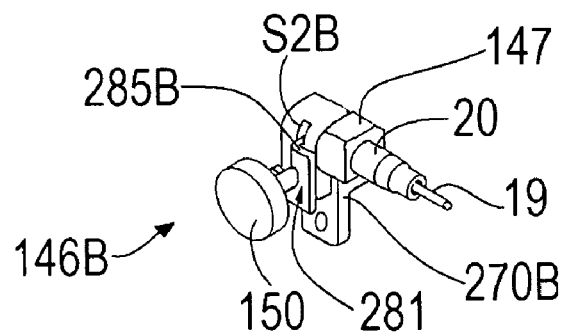
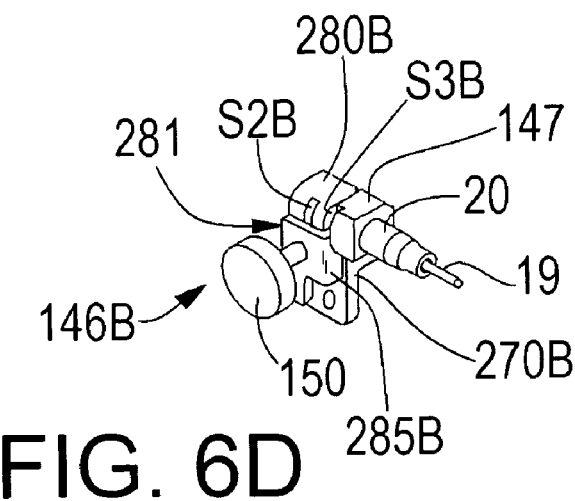
FIG. 6D

WELDING GUN ATTACHMENT MECHANISM

CROSS-REFERENCE TO RELATED APPLICATIONS

This application is a Continuation-in-Part application claiming priority under 35 U.S.C. 120 to U.S. application Ser. No. 10/820,996, filed Apr. 8, 2004, and U.S. application Ser. No. 10/820,997, filed Apr. 8, 2004, both of which are incorporated by reference in their entireties.

BACKGROUND

The present invention relates generally to welding systems, and more particularly, to apparatus for feeding welding wire in welding systems.

An important part of welding systems is the mechanism that feeds an electrode wire, a filler-material wire, or other weld wire to the work piece. Weld wires range in size and in material composition. Typically, weld wires range in size from approximately 0.023 inch in diameter to approximately 0.052 inch in diameter and can be as large as approximately 0.250 inch in diameter, and include material compositions of steel, stainless steel, aluminum, and/or other materials.

As used herein, the phrase "wire feeder assembly" includes a spool of weld wire, a drive assembly, any gun liner, and any other support or control apparatus along the path of travel of the wire between the spool and the contact tip of the gun, including the electronic controls.

Wire feeder assemblies generically comprehend electrode wire feeders used in e.g. Gas Metal Arc Welding (GMAW) in which the electrode wire is fed as part of the welding circuit and melts to become part of the weld deposit/pool. Wire feeder assemblies also include cold wire feeders used in e.g. Gas Tungsten Arc Welding (GTAW) and laser welding in which the filler-material wire is fed into, and melts from the heat of, the weld pool and thus becomes part of the weld pool.

In addition, wire feeder assemblies and/or components thereof can be used to drive materials other than weld wire, such materials typically having generally physically similar characteristics and/or properties to those of weld wire.

The drive assembly typically includes an electric motor which drives a rotationally-driven drive roll, which cooperates with a corresponding pressure roll. Both the rotationally-driven drive roll and the pressure roll, e.g. a pressure drive roll, cooperate in driving the weld wire. The rotationally-driven drive roll and the pressure drive roll have outer circumferential surfaces, at least one of the drive roll and pressure drive roll having a groove formed therein sized and configured to accept a weld wire having a particular diameter, between the cooperating drive rolls.

The pressure drive roll applies lateral pressure against the weld wire and correspondingly against the rotationally-driven drive roll. When the electric motor is energized, it rotationally drives the rotationally-driven drive roll which, in cooperation with the pressure drive roll, advances the weld wire through the liner and contact tip in the welding gun, and into the weld pool.

The drive assembly can jam if the weld wire strays from the desired feed path which extends through the e.g. nip which is defined between the upper and lower drive rolls. Wire jams can be caused when the weld wire collapses as the compressive columnar strength of the weld wire is exceeded, whereupon the weld wire becomes bunched up, tangled, wrapped around drive rolls, or other components in the drive assembly, or otherwise travels along a non-desired path or deviates from the desired path. In any case, such deviant wire travel is sometimes referred to as e.g. "bird's nesting."

"Bird's nesting" normally occurs in an area in which the weld wire is unsupported, and typically happens when the weld wire drag, or resistance to movement through the liner, combines with the weld wire driving force applied by the drive rolls to overcome the columnar strength of the wire. When the columnar strength is exceeded, the weld wire ceases movement through the conduit, and piles up in the area of collapse, or travels along a non-desired path until the electric motor driving the drive rolls ceases its drive action.

"Bird's nesting" consumes operator/user time, requiring such operator/user to open the drive assembly and to untangle and/or otherwise clear the wire jam, and re-feed the weld wire along the wire drive path.

It is not desirable to have an operator/user opening the drive assembly more often than necessary, as many welding operations are performed in rather harsh environments and dirt and/or other debris frequently found in such welding environments can eventually become lodged in e.g. the liner of the weld gun, which further compromises the travel of the weld wire to the workpiece.

When a wire jam occurs, the weld wire does not advance through the liner and contact tip of the welding gun. Thus the weld wire which extends beyond the contact tip is consumed without a new portion of the weld wire advancing to replace the consumed portion. This phenomenon is commonly referred to as "burn-back" and can result in the weld wire melting into, and thus becoming welded to, the contact tip of the gun. In the event where the weld wire becomes welded to the contact tip, the operator/user typically must install a new contact tip before proceeding with any more welding operations.

As weld wire is advanced along either a desired path e.g. out a welding gun or along a non-desired path such as "bird's nesting," the weld wire can be energized by a welding power source. Accordingly, if the deviant weld wire comes into electrical contact with e.g. the electric motor of the drive assembly, the integrity of the electric motor can be compromised. Also, since such advancing weld wire is electrically "live," a weld wire which advances along a non-desired path, for example outwardly of the drive assembly, can pose safety hazards for the operator and/or any persons near such activity.

Some weld wires are generally more susceptible to "bird's nesting" than other weld wires. As one example, aluminum weld wires are more susceptible to traveling along a non-desired path than are steel weld wires because aluminum has a relatively lower columnar strength and a relatively more easily deformable cross section, and/or relatively more malleable.

Numerous approaches of dealing with "bird's nesting" problems in wire feeders have been attempted, including use of TEFLON, and relatively shorter liners in weld guns, and use of weld wire spool guns which are weld guns that house and drive a spool of weld wire in the gun itself rather than having the weld wire spool mounted in combination with a control box. However, it is sometimes desirable to use a weld gun which has a relatively long liner to enable an operator/user to weld at a point relatively distant from the weld wire feeder apparatus. In addition, weld wire spool guns are bulky in comparison to typical weld guns and accordingly can be relatively cumbersome to operate. Further, an operator/user may desire to weld with a spool of weld wire which is larger than that which can be housed in a weld wire spool gun, e.g. it may be desirable to use a 12 inch spool of weld wire instead of a 4 inch spool.

It is desirable, therefore, to improve weld wire feeder assemblies to provide more support for a weld wire in areas of the feeder assemblies in which a weld wire is typically unsupported. In addition, it is desirable to improve weld wire feeder assemblies to provide a relatively more consistent, and relatively more desirably distributed, pressure to a weld wire.

Another problem with typical weld wire feeder assemblies is that service and repair of the drive assembly can be difficult, especially in the field. As one example, weld wire feeder assemblies having two drive mechanisms typically require at least some different components for e.g. left and right drive assemblies, which require storage of corresponding piece-parts for each of the left and right drive assemblies.

Yet another problem with typical weld wire feeder assemblies is realized at the interface between the weld wire feeder assembly and the "power interface" of the welding gun which is typically referred to as the "power pin." Power pins are typically aligned with, and communicate with, the weld wire feeder assembly to enable the weld wire, the electrical power, and/or shielding gas, to pass therethrough. Typical power pins are clamped by a clamping mechanism to the weld wire feeder. Such power pin is known to be subjected to tension force, exerted along the longitudinal axis of the power pin, and tending to urge a withdrawal of the power pin from the weld wire feeder assembly. Known clamping mechanisms can, on occasion, provide insufficient clamping force against the tension being exerted on the power pin, and correspondingly the power pin may respond with non-desired, at least partial, removal or detachment of the power pin from the weld wire feeder assembly.

It is desirable, therefore, to improve the weld wire feeder assembly to provide a weld wire feeder/power pin interface with a mechanical interface which further resists non-desired removal or detachment of the power pin from the weld wire feeder assembly. It can also be desirable to provide a wire feeder/power pin interface having a selectable mechanical interface, so that a user can selectively choose to utilize, or not, such mechanical interface to further resist non-desired removal or detachment of the power pin from the weld wire feeder assembly as desired.

As another example of needed improvements, changing drive rolls in some drive assemblies requires tools. Certain known "tool-less" drive assembly designs require a dexterous manipulation of one or more components of the drive assembly.

Therefore, it is also desirable to provide weld wire feeder assemblies which are easily serviced and/or repaired and which have drive assembly components which are common to both left and right drive assemblies, and methods and apparatus which facilitates easy removal and/or changing of drive rolls, other components, or consumable components, without using tools.

It is also desirable to provide drive assemblies which require a cover to be closed over the internal components before operation of the drive assembly, which increases the probability of achieving a relatively clean operational environment within the drive assembly.

It is also desirable to provide re-designed drive assemblies which impede the development of "bird's nesting," and which facilitate the travel of the weld wire along the desired path.

SUMMARY

A power block for holding a welding gun power pin has a receiving structure which defines a receiving structure cavity. The power block further includes a projection movable between at least a first position and a second position. When the projection is in the first position, it extends at least partially into the receiving structure cavity. When the projection is in the second position, it generally does not extend into the receiving structure cavity. In some embodiments, the projection defines a generally planar profile. In other embodiments, the projection defines a generally arcuate profile.

According to another aspect of the invention, the power block is selectable between at least a first and a second configuration. In the first configuration, the receiving structure has a generally continuous inner circumferential surface. In the second configuration, the receiving structure has a generally discontinuous inner circumferential surface.

Regardless, the power block, at least selectably, provides relatively increased resistance to non-desired power pin removal from the power block, as compared to a power block with only a clamping power pin attachment mechanism.

Other advantages, benefits, and features of the present invention will become apparent to those skilled in the art upon reading the detailed description of the illustrated embodiments.

BRIEF DESCRIPTION OF THE DRAWINGS

FIGS. 6B and 6C show enlarged perspective views of a second embodiment of a power block of the present invention.

FIG. 6D shows an enlarged perspective view of a third embodiment of power blocks of the present invention.

Figure 1:
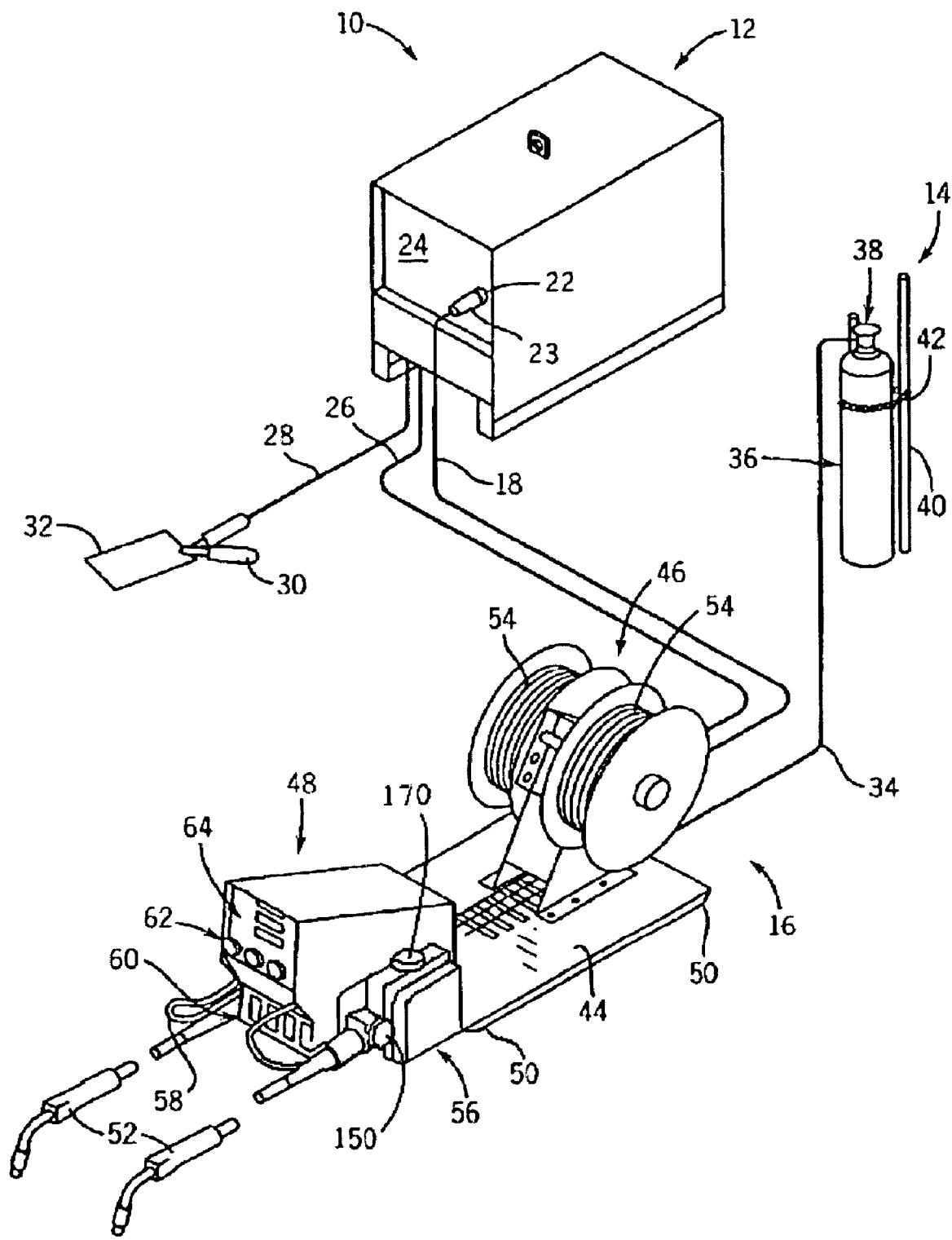
FIG. 1 shows a perspective view of a first embodiment of a welding system which includes a wire feeder assembly of the present invention.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

While the present invention is illustrated with reference to a particular welding wire feeder assembly having a particular configuration and particular features, the present invention is not limited to this configuration or to these features, and other configurations and features can be used.

Similarly, while the disclosure hereof is detailed and exact to enable those skilled in the art to practice the invention, the invention is embodied in other structures in addition to the illustrated exemplary structures. The scope of the invention is defined in the claims appended hereto.

Referring now to FIG. 1, a welding system 10 comprises a power source 12, a gas supply 14, and a wire feeder assembly 16. Preferably, power source 12 is a constant voltage welding power source which supplies welding arc power, and 24 VAC control power, to wire feeder 16. Wire feeder assembly 16 is electrically connected to the power source 12 via control cable 18 which carries the 24 VAC control power. Cable 18 includes a control output pin 23 which engages a corresponding nut 22 on the front panel 24 of power source 12. Also connected between power source 12 and wire feeder assembly 16 is weld cable 26. Weld cable 26 can be either a positive weld cable or a negative weld cable, depending upon the particular welding process. Hereinafter, however, cable 26 is described as a positive weld cable. As such, a negative weld cable 28 also extends from the power source 12. Negative weld cable 28 extends from power source 12 to a clamping member 30 which is adapted and configured to be attached to workpiece 32. Since positive weld cable 26 extends to wire feeder assembly 16, and negative weld cable 28 extends to workpiece 32, the requisite voltage potential between the wire feeder assembly and workpiece, necessary for welding, is achieved.

Also connected to wire feeder assembly 16 is a gas hose 34 which supplies gas for the arc-welding process, from gas cylinder 36. Gas cylinder 36 includes a regulator and flow meter 38 and, in the embodiment illustrated in FIG. 1, is securely positioned against structure 40 via chain 42.

Wire feeder assembly 16 includes a base plate 44 which is configured to support wire feed spindles 46 and control box 48. On the undersurface of base plate 44 are a number of rubber feet 50 which help to limit sliding of wire feeder assembly 16, as is described hereinafter with respect to FIG. 2. In the Illustrated embodiment, wire feeder assembly 16 includes first and second welding guns 52 which are supplied with weld wire, which is initially stored on wire feed spindles 46, by corresponding drive assembly 56. Each drive roller assembly 56 is connected to control box 48 by electrical leads 58.

Control box 48 includes a number of controls 60 which are used by the welder operator in conducting the welding operation. The switches which are indicated in controller 60 include jog/purge push buttons and an ON/OFF switch (not shown). Additional controls 62 include knobs which control the wire speed and a left/right switch 64.

Figure 2:
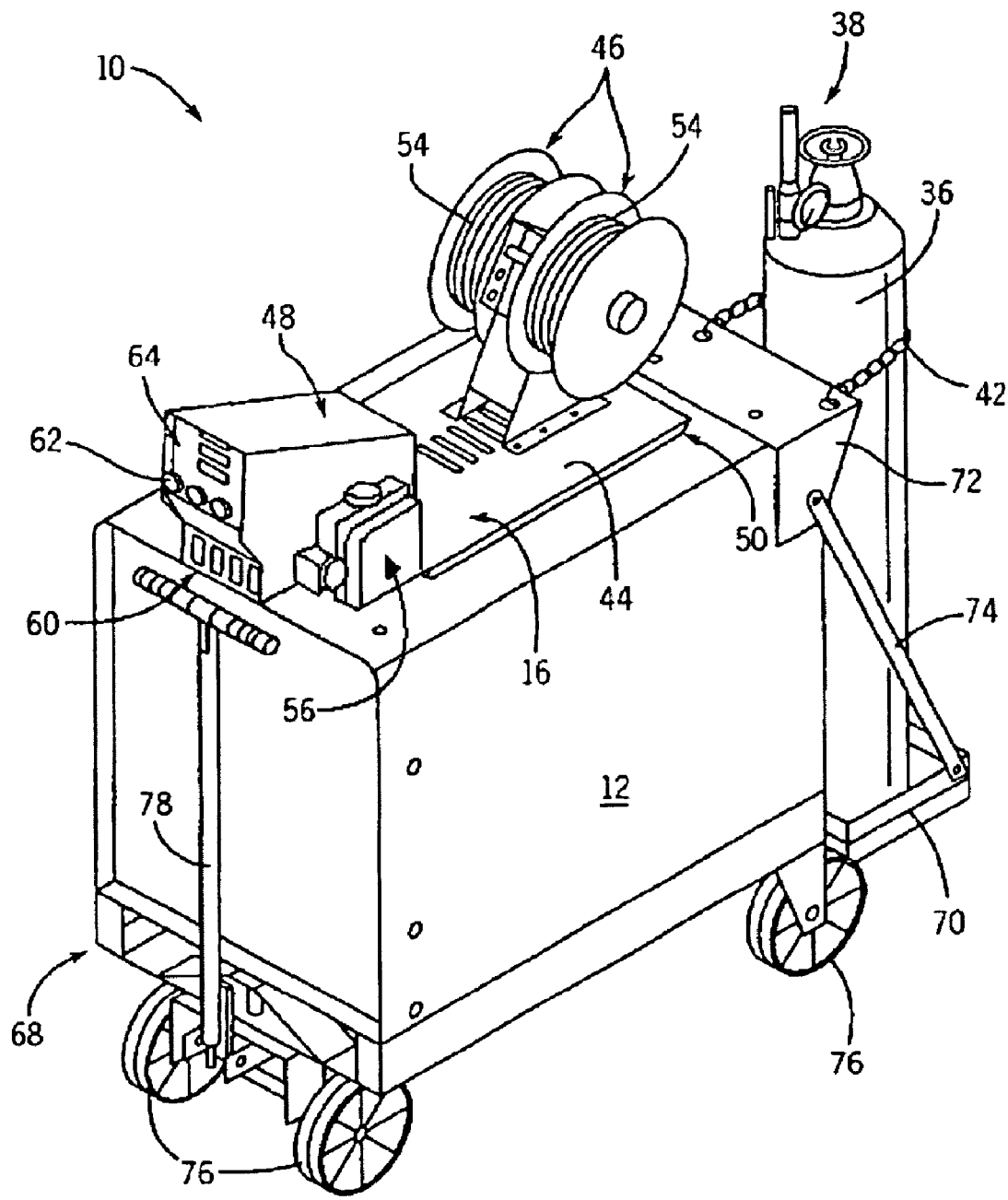
FIG. 2 shows a perspective view of a second embodiment of a welding system which includes a wire feeder assembly of the present invention.

Referring now to FIG. 2, the aforementioned welding system can also be embodied in a portable system. That is, the wire feeder assembly 16 can be positioned atop the power source 12 and jointly placed on a pull cart 68. The previously described rubber feet 50 limit sliding movement of the feeder when atop the power source 12. The pull cart can also include a cylinder support tray 70 configured to support gas cylinder 36. In this embodiment, chain 42 is secured to plate 72 which is connected to support tray 70 via cross-member 74. Plate 72 is also secured to a top rear portion of power source 12. Pull cart 68 includes wheels 76 and pulling arm 78 to assist with the transportability of the welding system.

Figure 3:
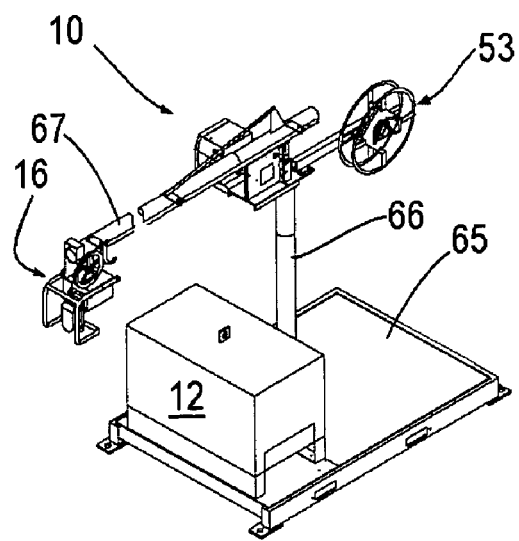
FIG. 3 shows a perspective view of a third embodiment of a welding system which includes a wire feeder assembly of the present invention.

Referring now to FIG. 3, in some embodiments welding system 10 comprises a relatively stationary power source 12, and a wire feeder assembly 16, optionally at least two wire feeder assemblies 16, adapted to be generally mobile relative to power source 12. Power source 12 can be positioned atop frame 65, and a post 66 can extend upwardly from frame 65. Beam 67 is pivotably attached to, and extends away in a first direction from, post 66. A support arm (not labeled) extends away from post 66, in a second opposite direction, and holds/supports reel 53. Reel 53 is adapted and configured to hold a spindle 46 (FIG. 2) of weld wire 54 (FIG. 2).

Preferably, beam 67 comprises a vertically oriented swivel assembly which enables the distal end of beam 67 to pivot about the swivel assembly, upwardly away from, and downwardly toward, frame 65 along an arcuate travel path. A first wire feeder assembly 16 can be mounted to the distal end of beam 67. In some embodiments, a second wire feeder assembly 16 is mounted near the point of attachment of beam 67 to post 66, and is aligned with the first wire feeder assembly 16, enabling a weld wire 54 (FIG. 2) to be fed through the first and second wire feeder assemblies 16, in series.

Figure 4:
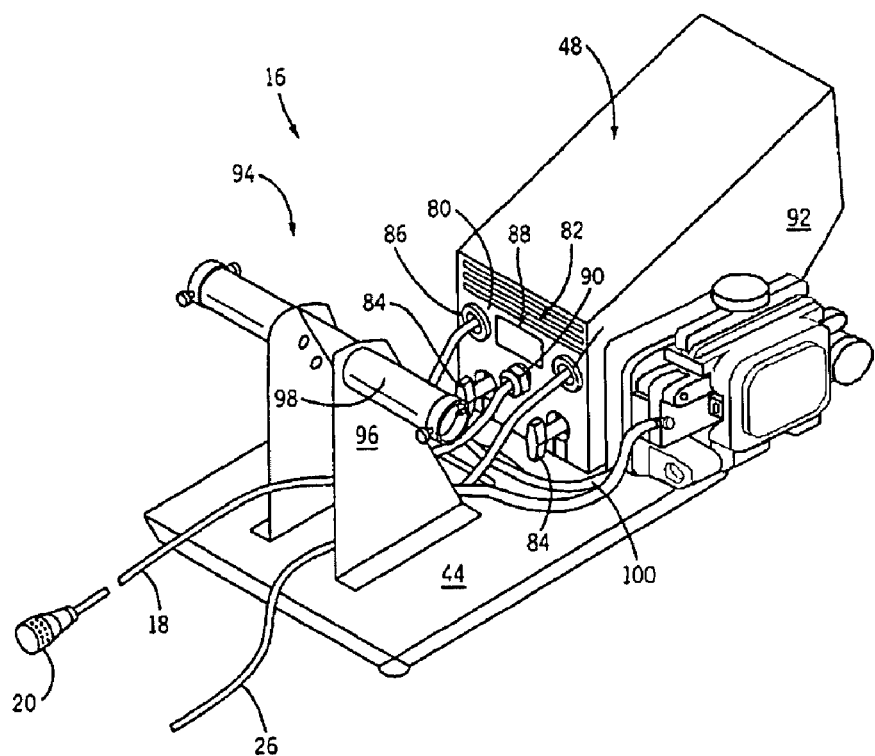
FIG. 4 shows a perspective view of a wire feeder assembly of the welding system illustrated in FIGS. 1–2.

Referring now to FIG. 4, the rear portion of wire feeder assembly 16 is shown. Control box 48 includes a back panel 80 which has a number of cooling vents 82 and a drive assembly rotation knob 84. Also secured to back panel 80 is a pair of shielding gas valve fittings 86, each of which receives a shielding gas hose. Preferably, positioned between the two shielding gas valve fittings 86, is a rating label 88. Control cable 18 is also connected to the back panel 80 via socket 90.

Figure 5:
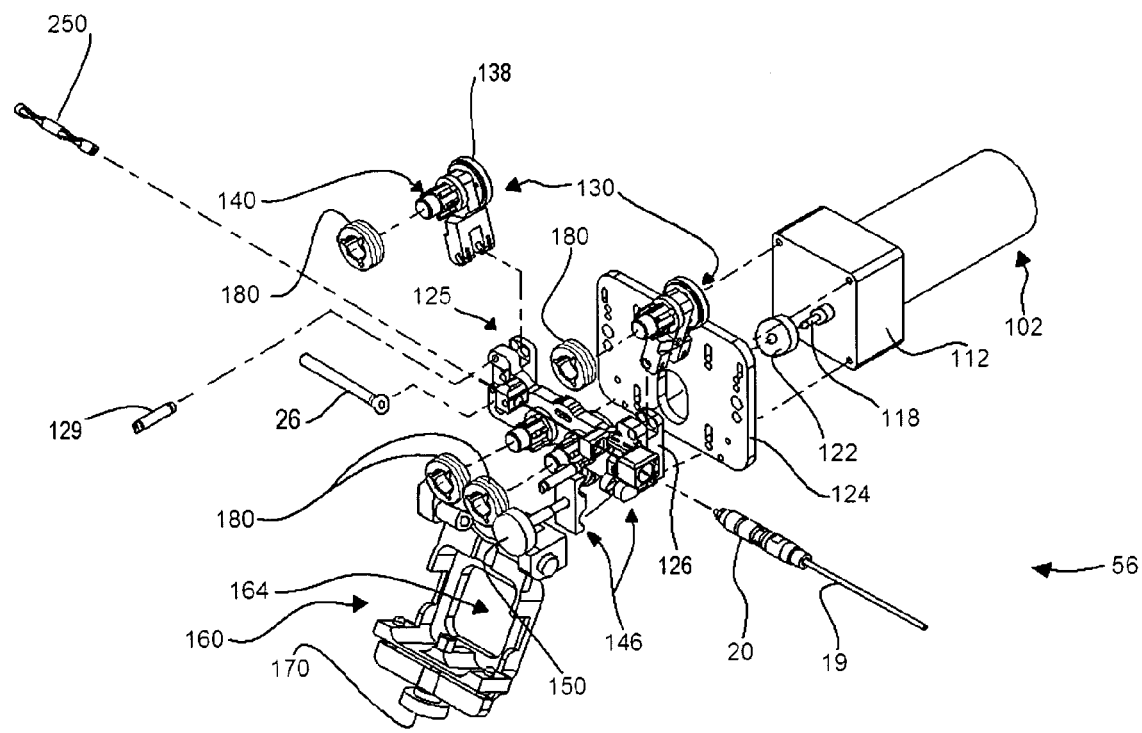
FIG. 5 shows an exploded view of a drive assembly of a wire feeder assembly of FIG. 4.

Mounted adjacent each side panel 92 of the control box, and supported by plate 44, is a drive assembly 56 (FIGS. 4 and 5). Each drive assembly 56 includes a motor and other related components, which are described in greater detail below, which receive 24 VAC control power from cable 18. Also supported by base plate 44 is a pair of structures 94, each consisting of a vertical plate 96 and rod 98 which supports a wire spool or reel 46 (FIG. 1). A jumper cable 100 extends between the drive assemblies, thereby providing power from the single weld cable 26 to both drive assemblies.

One embodiment of drive assemblies 56 of the present invention is shown in exploded detail in FIG. 5. The drive assembly includes motor 102 attached to a gearbox 112 which is in turn attached to isolation plate 124. Also attached to isolation plate 124 is carrier plate assembly 125 to which is attached swingarm assemblies 130, power block 146A (FIG. 6A) and cover assembly 160.

Figure 6A:
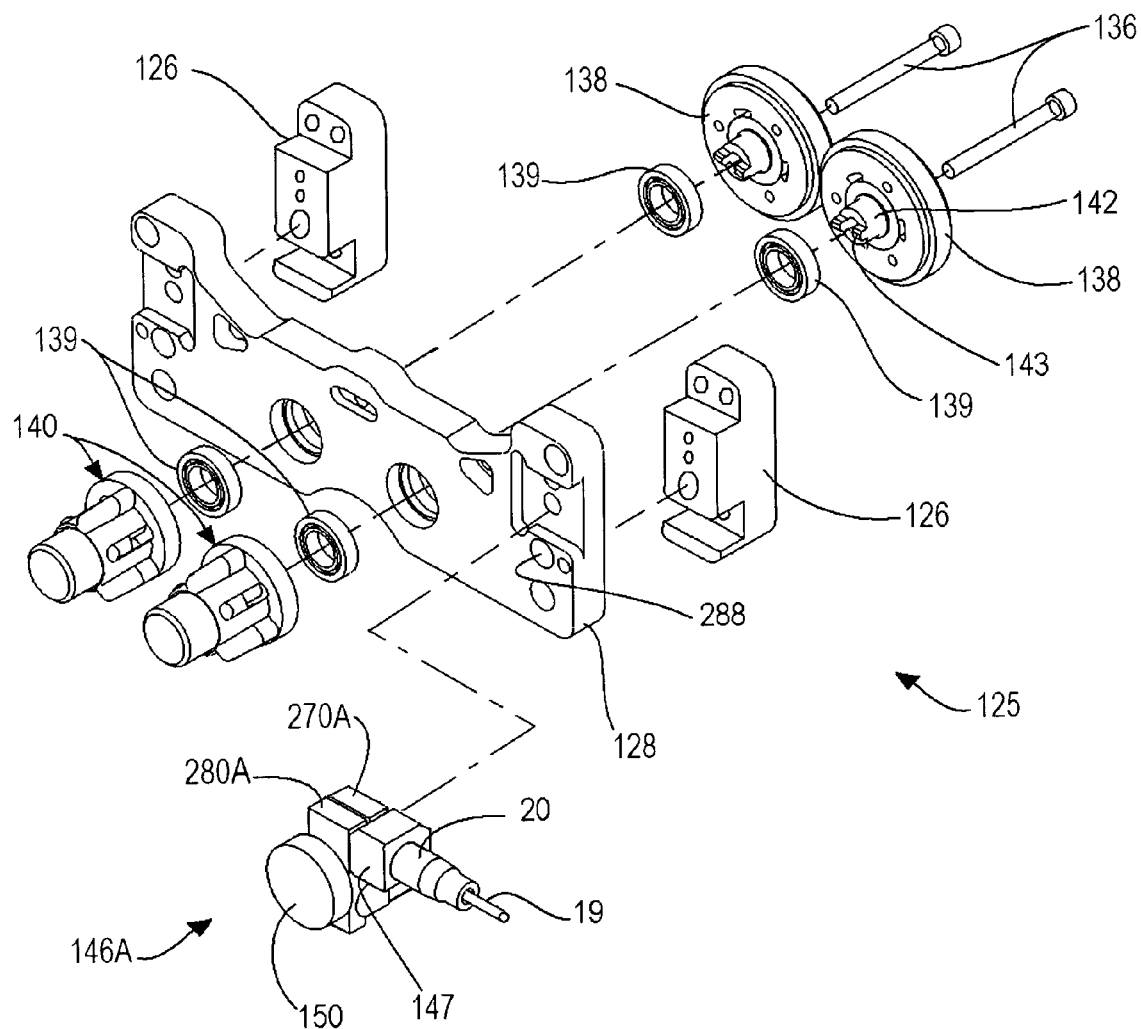
FIG. 6A shows an exploded view of the carrier plate assembly illustrated in FIG. 5.
Figure 16:
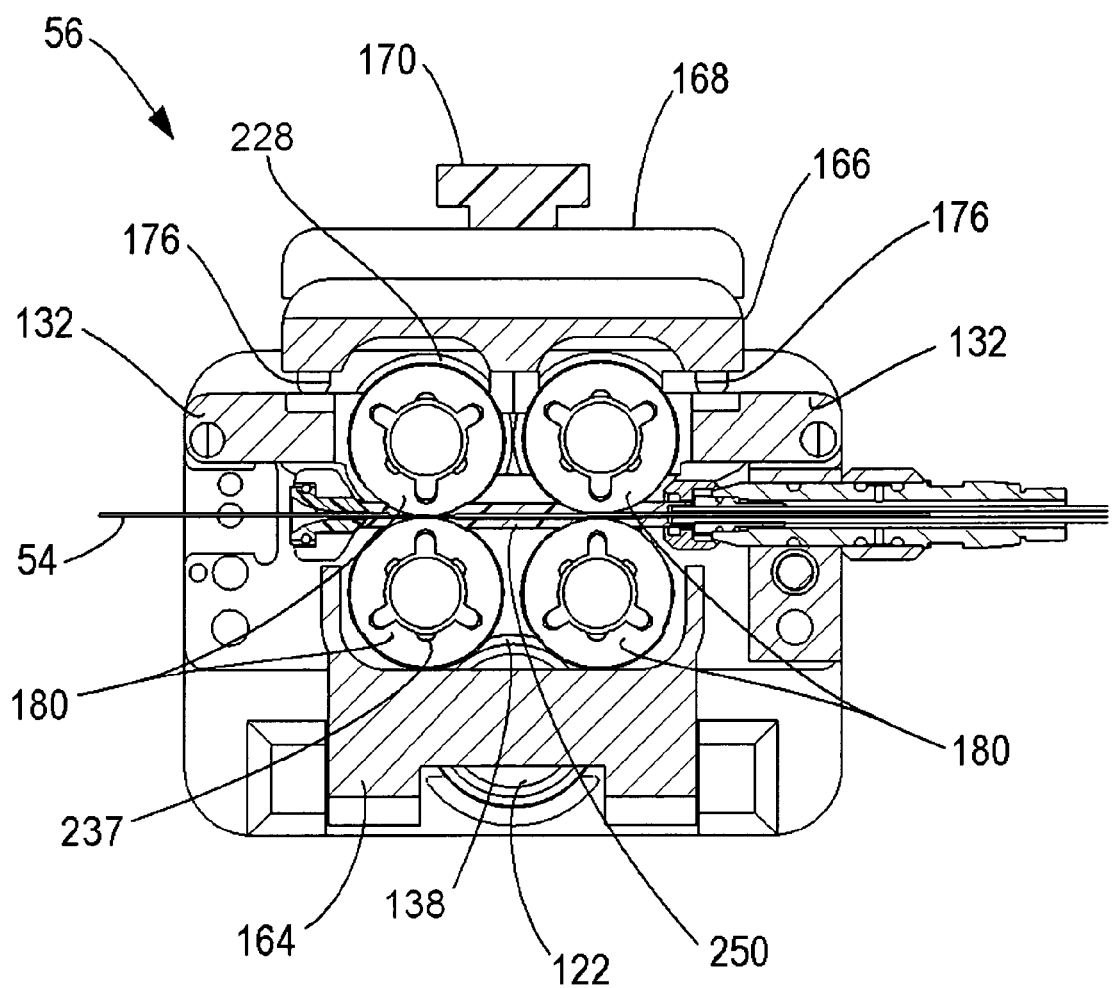
FIG. 16 shows a cross-sectional view of parts of an embodiment of a drive assembly of the present invention with the cover in the closed position.

In some embodiments, motor 102 is e.g. a one-eighth horsepower, 24 volt DC motor. One end of motor 102 is attached to a first side of gearbox 112, including a motor output shaft which is operably connected to the operating mechanism in gearbox 112. Extending outwardly from an aperture on a second opposite side of gear box 112 is a gearbox output shaft 118. Output shaft 118 is attached to, preferably removably attached to, drive pinion 122 by conventional means of attachment, including but not limited to, retaining rings, splined shafts and slots, keyway attachments, pins, and others. Drive pinion 122 has an outer circumferential surface which is adapted and configured to drivingly engage the outer circumferential surface of a second pinion such as carrier pinion 138 (FIGS. 6A and 16).

The side of gearbox 112, through which output shaft 118 extends, communicates with a first side of isolation plate 124 which is constructed of an electrically insulating, e.g. polymeric, material. A second, oppositely facing side of isolation plate 124 communicates with carrier plate assembly 125 which is attached to isolation plate 124. Gearbox 112, and thus electric motor 102, are mounted to isolation plate 124, separately from carrier plate assembly 125 whereby components of electric motor 102 and gearbox 112 are electrically isolated from components of carrier plate assembly 125. In addition, the drive train which connects shaft 118, drive pinion 122 and e.g. carrier pinions 138, includes one or more electrical isolation components which electrically isolate the motor end of the drive train from the driven end of the drive train. For example, drive pinion 122 can have a non-conducting e.g. nylon core which drives a conducting, e.g. metal toothed outer ring, or for example a metal core which drives a non-conducting toothed outer ring. Or shaft 118 can be non-conducting, or driven pinion 138 can be non-conducting. In light of disclosure herein, other non-conducting structures will be known or obvious to those skilled in the art.

Power block 146A (FIG. 6A) is mounted to carrier plate 128 and is thus also electrically isolated from components of electric motor 102 and gearbox 112. Referring again to FIG. 5, hinge pin 129 extends through at least one aperture which extends through an upper portion of carrier plate assembly 125 and at least one aperture which extends through swingarm assembly 130, thereby pivotably attaching swingarm assembly 130 to carrier plate assembly 125.

Weld cable 26, which typically carries the welding power from power source 12 to the drive assembly, attaches to carrier plate 128 at the end of plate 128 which is opposite power block 146A, as illustrated in FIG. 5, so as to electrically energize the drive assembly and pass the welding power to weld wire 54.

Attached to isolation plate 124, below the point of attachment of carrier plate assembly 125, is cover assembly 160. Cover 164 pivots about pins 163 (FIG. 15), relative to isolation plate 124, between first and second positions. In the first position, cover 164 generally covers carrier plate assembly 125. In the second position, cover 164 generally exposes carrier plate assembly 125. When cover 164 is in the position generally covering carrier plate assembly 125, upper components of cover assembly 160 communicate with cooperating elements of swingarm assemblies 130 and apply downward forces onto the swingarm assemblies 130.

Power block 146A is attached to carrier plate assembly 125. Knob 150 enables a user to removably secure power pin 20 (FIGS. 6A, 6B, 6C, 6D) and thus gun 52 (FIG. 1) to power block 146A. As is described in greater detail below, knob 170 has an elongate projection which is threadedly received in an aperture which extends through a top portion of cover 164, enabling knob 170 to be manipulated by a user to adjust the amount of force which is applied to swingarm assemblies 130.

Wire guide 250 (FIG. 5) extends generally parallel to, and along a portion of, carrier plate assembly 125. Wire guide 250 is adapted and configured to be received between at least two of drive rolls 180 and has first and second opposing ends. The first end of wire guide 250 is generally oriented toward spindles 46 (FIG. 1). The second end of wire guide 250 is generally oriented toward power pin 20.

Carrier plate assembly 125 as shown in detail in FIG. 6A includes spacer blocks 126 which communicate with isolation plate 124 (FIG. 5) and carrier plate 128. Assembly 125 further includes carrier pinions 138 which are mounted to plate 128 by bearings 139. Carrier pinions 138 are also drivingly mounted to carriers 140 by bolt 136, which extends axially through the respective apertures in carrier plate 128, as well as axially into both pinions 138 and carriers 140 such that carriers 140 turn in common with pinions 138 on bearings 139.

Carrier plate assembly 125 further includes power block 146A, which is mounted to carrier plate 128, as illustrated in FIG. 6A.

Spacer blocks 126 each have a first generally planar surface facing a first direction, which communicates with isolation plate 124 (FIG. 6A), and a second generally planar surface facing a second opposite direction, and communicating with carrier plate 128. The distance between the first and second generally planar surfaces of spacer blocks 126 defines a thickness dimension which is at least as great as the thickness dimension of carrier pinions 138, thus to enable carrier pinions 138 to be positioned between isolation plate 124 and carrier plate 128.

Carrier plate 128 has a plurality of apertures formed therethrough, which enable removable attachment of various components of the carrier assembly to the plate, using conventional hardware, such components including, but not being limited to, spacer blocks 126 and power block 146A.

Plate 128 has a thickness dimension corresponding in general to not less than, typically more than, the collective thickness dimension of bearings 139. Where, as illustrated in FIG. 6A, multiple bearings are used in side by side relationship, the thickness of plate 128 at the bearing apertures is preferably at least as great as the combined thicknesses of all the bearings which are used in the respective bearing apertures.

The bearing apertures are sized and configured to receive the outer races of bearings 139 to be inserted thereinto, enabling bearings 139 to be accepted into plate 128 by e.g. a press fit. In preferred embodiments, the bearing apertures include a lip or shoulder to provide a mechanical stop, and thus separation, between respective bearings 139. Accordingly, the bearings 139 are separated from each other by a distance corresponding to a thickness dimension defined by the lip or shoulder of the bearing apertures.

The thickness dimensions of spacer blocks 126 provide adequate distance between isolation plate 124 and plate 128 so that carrier pinions 138 can generally freely rotate therebetween via bearings 139 without touching isolation plate 124.

A carrier pinion 138 has a generally cylindrical projection 142 which is adapted and configured to extend at least partially through, and to interface with, an inner race of a bearing 139. The terminal end of the cylindrical projection has at least one protuberance 143 which is adapted and configured to interface with carrier 140.

A bore extends through carrier pinion 138 and its cylindrical projection, enabling bolt 136 to extend through such bore and to threadedly attach carrier pinion 138 and carrier 140 to each other. Body 220 (FIG. 9B) of carrier 140 includes a base plate 221, which has opposing surfaces 223A, 223B. Surface 223B has one or more receptacles or recesses, which cooperate with and receive, protuberances 143 on the cylindrical projection of carrier pinion 138, such that the cooperation of the protuberances, and receptacles or recesses, causes carrier pinion 138 to drivingly engage carrier 140, e.g. rotation of carrier pinion 138 correspondingly drivingly rotates carrier 140. Carrier pinion 138 is mounted to carrier 140 by threads on bolt 136 being engaged with a threaded bore which extends through base plate 221 of carrier 140.

In some embodiments, the main power for establishing and maintaining the welding arc is transferred from power source 12 (FIGS. 1–3) through cable 26 (FIGS. 1 and 3) which is attached to one of the apertures extending through plate 128. The main power for the welding arc is then transferred through plate 128, which is made of a conductive material, through power block 146A, power pin 20, gun 52, and up to the weld/workpiece. In some embodiments, power from cable 26 is manipulated, by conventional means, to appropriate levels and thereupon is also used to energize motor 102 as desired, whereupon cable 18 is not needed.

In some embodiments, control cable 18 electrically connects power source 12 to wire feeder assembly 16, and weld cable 26 directly communicates with and/or is attached to, welding gun 52. In such embodiments, the welding arc power is carried from power source 12 to welding gun 52, through weld cable 26, without passing through feeder assembly 16 prior to the welding gun. Thus, in such embodiments, power pin 20 and the respective power block 146A, 146B (FIGS. 6A, 6B, 6C, 6D) do not carry welding arc power therethrough.

Figure 7:
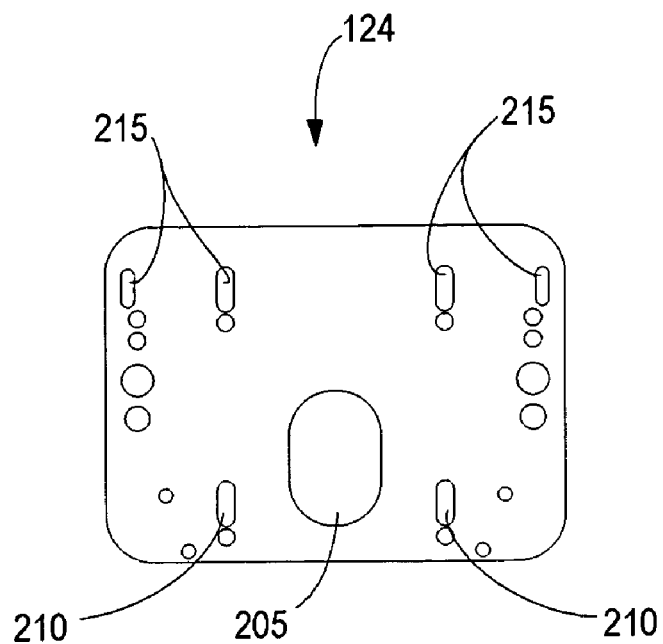
FIG. 7 shows an enlarged front elevation view of the isolation plate illustrated in FIG. 5.

Isolation plate 124, as shown in detail in FIG. 7, has a first surface which faces and communicates with gearbox 112 (FIG. 5) and a second surface which faces the opposite direction, e.g. faces and communicates with carrier plate assembly 125. As shown in FIG. 7, isolation plate 124 has a plurality of generally annular apertures and a plurality of generally elongate apertures e.g. slot-shaped openings 205, 210, 215 which enable a user to adjust the mounting positions of respective components which are mounted to isolation plate 124.

Output shaft 118 and drive pinion 122 extend through opening 205, sufficiently far to enable drive pinion 122 to interface with ones of carrier pinions 138 (FIGS. 5 and 16). In some embodiments, gearbox 112 has a generally rectangular face which communicates with isolation plate 124 and the mounting structure e.g. a threaded post or bolt proximate each corner.

Each of the mounting structures extends through respective ones of e.g. slots 210, 215, thus enabling gearbox 112 to be attached to isolation plate 124 with convention hardware. Slots 205, 210, 215 are adapted and configured to enable a user to mount gearbox 112 relatively higher or relatively lower on isolation plate 124 corresponding to e.g. the diameter of a desirable drive pinion 122. Gearbox 112 is mounted relatively lower in slots 205, 210, 215 to accommodate a relatively taller (greater diameter) drive pinion 122 and is mounted relatively higher in slots 205, 210, 215 to accommodate a relatively shorter (lesser diameter) drive pinion 122.

In preferred embodiments, isolation plate 124 is made of a poorly electrically conducting material, e.g. electrically insulating material, so as to electrically isolate the high voltage commonly employed on carrier plate assembly 125 and components mounted thereto, from gearbox 112 and components mounted thereto. Suitable materials for making isolation plate 124 include, but are not limited to, various polymeric compounds such as various of the polyolefins, and a variety of the polyethylenes, e.g. high density polyethylene, or polypropylenes. There can also be mentioned such commodity polymers as polyvinyl chloride and chlorinated polyvinyl chloride copolymers as well as a wide variety of the copolymers which embody the above-recited materials, as well as others.

Referring now to FIGS. 6A, 6B, 6C, 6D, 8A, 8B, 8C, 8D, and 8E, power block 146A, 146B is mounted to plate 128 at a recess in plate 128. Power block 146A, 146B includes knob 150, power block base 270A, 270B, and pin holder 280A, 280B. In the complete assemblage of carrier plate assembly 125, power block 146A, 146B interfaces with, and/or otherwise communicates with, gas block 147. Gas block 147 enables the gas from gas hose 34 (FIG. 1) to flow into power pin 20, and thus to welding gun 52 and ultimately to the workpiece.

In some exemplary embodiments, such as those illustrated in FIGS. 6A, 8A, 8B, and 8C, power block base 270A has, on one side, a concave generally half-cylindrical configuration, e.g. receiving structure 272A, formed therein, and on another side a convex generally half-cylindrical projection, e.g. knuckle 274A extending upwardly therefrom. Knuckle 274A defines an outer surface into which slot S1A extends. Slot S1A comprehends a variety of receiving structures which include, but are not limited to, depressions, channels, grooves, slots, apertures, and/or others. Bore 276A extends through a medial portion of power block base 270A, generally between receiving structure 272A and knuckle 274A.

Figure 8A:
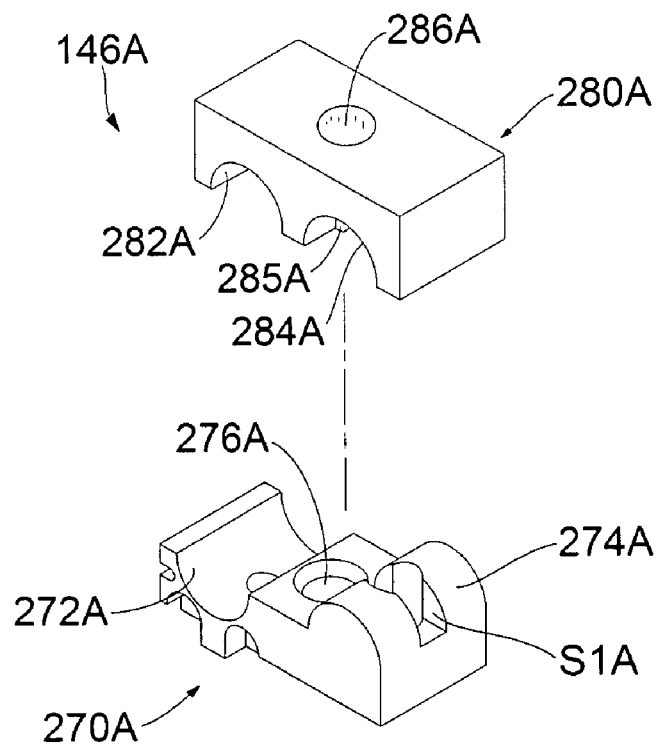
FIGS. 8A, 8B, and 8C show enlarged perspective views of the power block illustrated in FIG. 5.
Figure 8B:
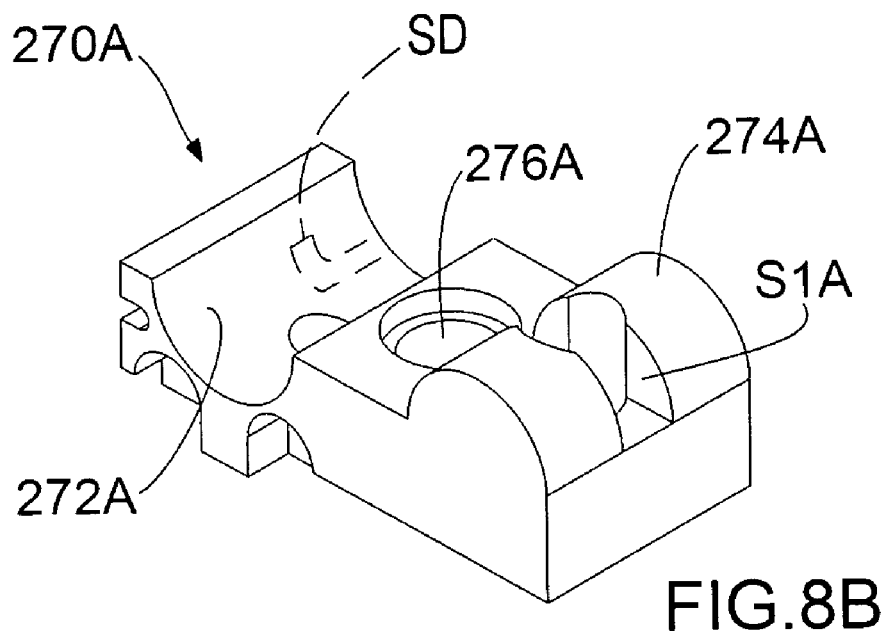
Figure 8C:
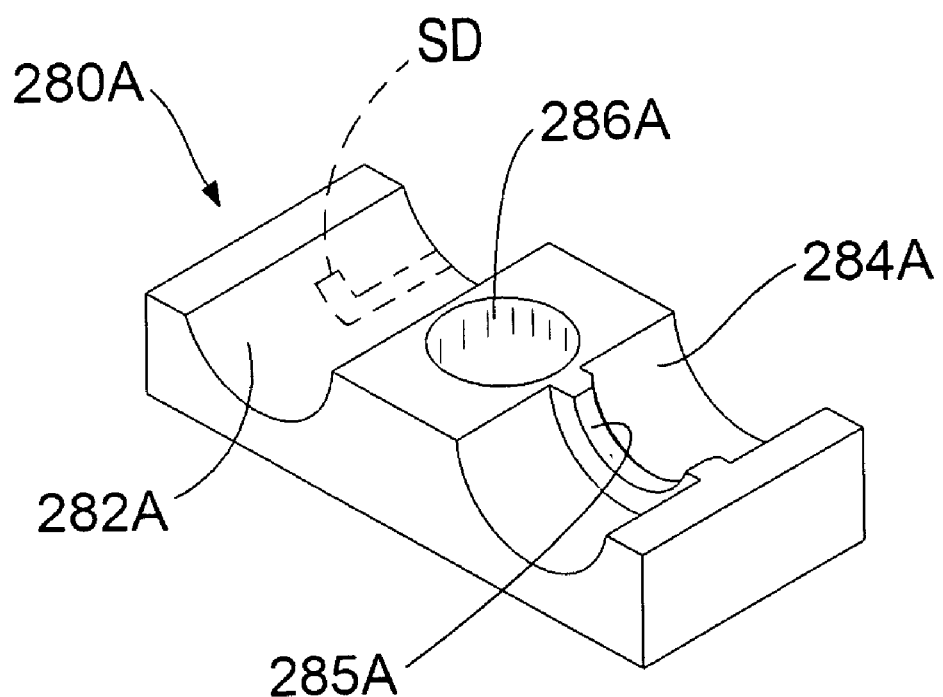

Pin holder 280A has, on one side, a concave generally half-cylindrical-configuration, generally continuous first relief structure formed therein, e.g. receiving structure 282A, and on another side a generally half-cylindrical-configuration second relief structure, e.g. receiving structure 284A, which is effectively discontinuous as separated by a projection such as a rib, a protuberance, a shoulder, an outthrust, and/or other structure that extends outwardly from the receiving structure surface, e.g. arm 285A (FIG. 8C).

Arm 285A is shown as continuous along the length of the arm and about the curved contour of the receiving structure. Discontinuous arms 285A are also contemplated. Bore 286A extends through a medial portion of pin holder 280A generally between receiving structures 282A and 284A. As illustrated in FIG. 8C, arm 285A is generally arcuate and extends/projects upwardly from a surface of receiving structure 284A and thus provides a generally arcuate interface adapted and configured to interface with pin 20. In other embodiments, arm 285A is generally planar and extends/ projects upwardly from a surface of receiving structure 284A and thus provides a generally planar interface adapted and configured to interface with pin 20.

In some embodiments, pin holder 280A has more than two receiving structures formed therein. For example, pin holder 280A can further include third and fourth receiving structures (not illustrated) located on opposite side of bore 286A from each other and which extend in directions generally perpendicularly to the directions in which receiving structures 282A and 284A extend. In such alternative embodiments, pin holder 280A as viewed from above appears generally "X-shaped" and has two pairs of generally parallel receiving structures, whereby the first and second pair of receiving structures are generally perpendicular to each other.

Knob 150 has an elongate threaded stem which extends freely through bores 276A and 286A, and which threadedly engages aperture 288 (FIG. 6A) in plate 128, thus mounting base 270A and pin holder 280A, and correspondingly power block 146A, to plate 128 while enabling pin holder 280A to be rotated about the stem, as well as about base 270A. Accordingly, pin holder 280A can be rotated and/or reversed between first and second positions, optionally between other sets of positions. In the first operative position, receiving structure 272A and receiving structure 282A are generally aligned with each other to collectively form a bore which has a first internally facing surface configuration, and which receives and holds pin 20. In the second operative position, receiving structure 272A and receiving structure 284A are generally aligned with each other to collectively form a bore which has a second different internally facing surface configuration, and which receives and holds pin 20.

Knob 150 can also be used, by way of the threaded stem, to tighten pin holder 280A against power block base 270A. Tightening knob 150, and thus pin holder 280A against power block base 270A, enables power block 146A to securely capture and hold the power pin 20. Pin 20 can be captured/held in the bore between receiving structures 272A and 282A, alternatively in the bore between receiving structures 272A and 284A. The determination of which set of receiving structures is used depends on the configuration of the respective power pin. In some embodiments, pin 20 has a power block interface, such as a groove or channel, which is adapted and configured to receive arm 285A of receiving structure 284A enabling arm 285A to provide a mechanical interference between facing surfaces of the groove or channel of pin 20, and arm 285A of power block 146A, in addition to the clamping e.g. squeezing force provided by respective components of power block 146A.

Arm 285A can alternatively project and/or otherwise extend from other surfaces of power block 146A and still project/extend generally into the cavity defined by the receiving structure. As one non-limiting example, arm 285A can extend from power block base 270A and into the receiving structure cavity. As another non-limiting example, arm 285A can extend from both power block base 270A and pin holder 280A and into the receiving structure cavity.

The power block interface of pin 20 and arm 285A cooperate to relatively increase the resistance to e.g. non-desired power pin removal, such as for example when a user/operator does not desire pin 20 to be removed from power block 146A, and a force is applied generally coaxially with pin 20 in a direction outwardly from power block 146A which would correspondingly tend to urge removal of pin 20 from power block 146A.

In some embodiments, pin 20 has a generally continuous-diameter longitudinally-extending outer perimeter, and is devoid of any step-change power block interface and thus has, for example, a generally constant-magnitude outer circumferential surface. When such a pin 20, which is generally devoid of any step-change power block interface outer surface, is utilized, the user of wire feeder 16 aligns receiving structure 284A over knuckle 274A whereupon receiving structure 282A is aligned over receiving structure 272A. This alignment of receiving structure 284A and knuckle 274A enables arm 285A to extend into slot S1A (FIG. 8A, 8C) when, for example, the user tightens knob 150 and correspondingly draws pin holder 280A relatively nearer power block base 270A. In this first positional configuration, the aligned receiving structures 272A and 282A collectively define a generally continuous-diameter receiving structure surface e.g. a generally constant-diameter cylindrical bore which passes through the thus assembled combination of power block base 270A and pin holder 280A. In a second positional configuration, receiving structures 272A and 284A are generally cooperatively aligned and collectively define a generally discontinuous-diameter receiving structure surface e.g. a receiving structure surface which defines a receiving structure cavity, wherein arm 285A extends into the cavity.

Alternatively, at least one of receiving structures 272A, 282A, and 284A has, for example, a depression, groove, aperture, and/or other receiving formation formed thereinto in addition to, or in lieu of, e.g. a projection such as arm 285A e.g. a mirror-image female representation of arm 285A. In such embodiments, the power block interface of pin 20 has, for example, a projection extending therefrom which is adapted and configured to cooperate with the receiving formation of at least one of receiving structures 272A, 282A, and 284A. Yet other embodiments of power pin/receiving structure interfaces are considered including, but not limited to, cooperating tapered interfaces, multiple projecting elements and cooperating multiple receiving elements interfaces, simple step/shoulder interfaces, and/or others.

As one non-limiting example, at least one of receiving structures 272A, 282A, and 284A further includes a channel and/or slot as a receiving formation, namely surface depression "SD", which extends downwardly into the inner circumferential surface of at least one of receiving structures 272A, 282A. Surface depression "SD" is adapted and configured to, for example, cooperate with the power block interface of pin 20.

Surface depression "SD", as representatively illustrated in dashed outline in FIGS. 8B and 8C has an axial channel portion and a radial channel portion. The axial channel portion has first and second terminal ends. The first terminal end of the axial channel portion communicates with an outer edge of at least one of receiving structures 272A, 282A and the axial channel portion extends generally axially inwardly therefrom. The radial channel portion originates from the second terminal end of the axial channel portion and extends generally radially along at least a portion of the inner circumferential surface of receiving structures 272A, 282A.

Thus, surface depression "SD" enables the power block interface of pin 20 to slidingly and securingly interface with power block 146A, 146B. As one example, the power block interface of pin 20 includes a projection extending therefrom, whereby pin 20 can be slidingly inserted into the axial channel portion of surface depression "SD" and rotated into the radial portion of surface depression "SD." Thus, receiving structures 272A, 282A, and/or 284A define the "female" interface member and pin 20 defines the "male" interface member which together cooperatingly provide, at least in part, a mechanical interference effective to resist e.g. non-desired power pin removal.

In some exemplary embodiments, such as those illustrated in FIGS. 6B, 6C, 6D, 8D, and 8E, power block 146B includes power block base 270B and pin holder 280B which, as exemplarily illustrated, are at least partially integral with each other as a unitary body. Receiving structure 272B extends axially through at least one of power block base 270B and pin holder 280B and generally defines a receiving structure inner circumferential surface which in turn defines the outer perimeter of a receiving structure cavity. At least one surface depression "SD" (FIG. 8E) which is adapted and configured to, for example, cooperate with the power block interface of pin 20, can extend into the inner circumferential surface of receiving structure 272B. A bore, namely bore 286B extends through each of pin holder 280B and power block base 270B, in an orientation generally perpendicular to receiving structure 272B.

Pin holder 280B (FIG. 8D, 8E) has an upper surface which has at least one slot, such as slot S1B and/or slot S2B which extends at least part way through the top-to-bottom thickness of the pin holder. As exemplarily illustrated, slot S2B extends entirely through a portion of pin holder 280B and communicates with and opens into the receiving structure cavity of receiving structure 272B. In other embodiments, such as the non-limiting embodiment illustrated in FIG. 6D, slot S3B extends into power block 146B and communicates with each of gas block 147, pin holder 280B, and the receiving structure cavity in gas block 147.

Pin holder plate 281 is adapted and configured to communicate with, and move with respect to, other portions of pin holder 280B and other portions of power block 146B. Pin holder plate 281 has a generally planar main body portion. A bore 286C, which is open, optionally not open, along a major portion of the perimeter of the bore, extends generally medially through the main body of the plate, adjacent a sliding arm 285B which extends generally downwardly from the main body and which comprehends ribs, protuberances, shoulders, outthrusts, and/or other structures that extend outwardly from the main body of the plate. Thus, pin holder plate 281 is adapted and configured to rotatably, pivotably, slidingly, snapingly, removably, and/or otherwise movably communicate with e.g. the remainder of pin holder 280B.

In addition, sliding arm 285B is adapted and configured to be slidingly inserted into and/or at least partially through at least one of slots S1B, S2B, S3B. Accordingly, as desired, a user can selectively rotate plate 281 about the stem of knob 150, and push slide arm 285B through the respective slot S1B, S2B, S3B, and thus into the bore defined between the respective receiving structures. Or, as desired, the user can selectively move and insert arm 285B, for example, into slot S2B, whereby sliding arm 285B generally does not extend into, protrude into, and/or otherwise communicate with, the receiving structure cavity, but nevertheless extends into a bore at or adjacent block 147, through which pin 20 passes.

Figure 8D:
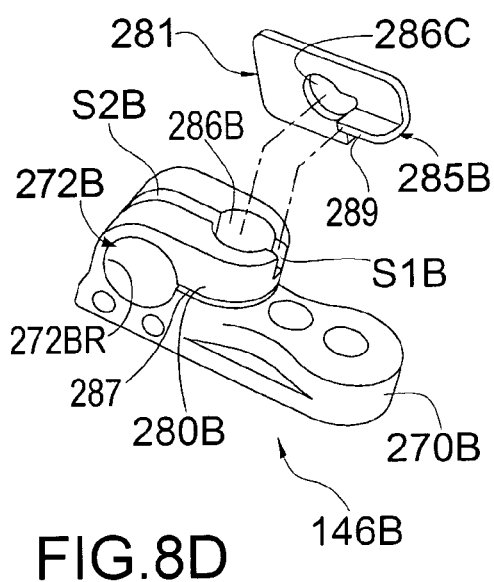
FIGS. 8D and 8E show enlarged exploded views of parts of a fourth embodiment of power blocks of the present invention.
Figure 8E:
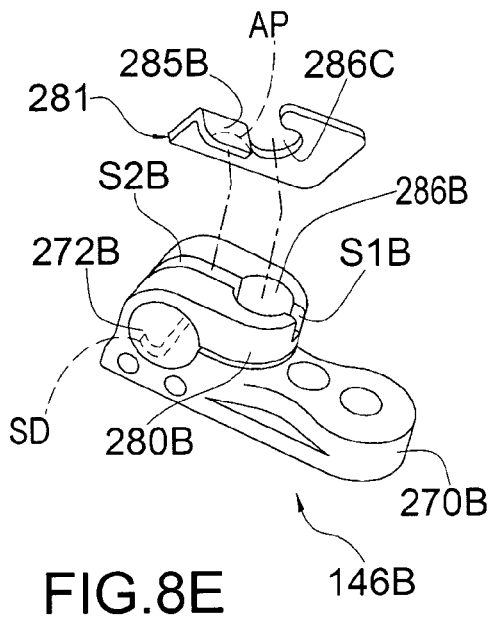

Since arm 285B has a generally planar configuration and a distal edge 289 which in FIG. 8D extends in a generally straight line, arm 285B extends into the receiving structure cavity, and provides a generally planar interface surface in the cavity, which generally planar interface is adapted and configured to interface with, to cooperate and/or to otherwise communicate with pin 20.

Distal edge 289 can alternatively extend along a generally arcuate path "AP" (illustrated in dashed outline in FIG. 8E) whereby arm 285B is adapted and configured to provide a generally arcuate interface thereby to better cooperate and communicate with the typically arcuate, e.g. cylindrical, outer surface of pin 20. Of course, arm 285B can further include other configurations such as cylindrical protrusions, serrated protrusions, and/or others.

The integral portion of power block 146B, where base 270B and pin holder 280B come together, communicates with a first radial portion 272BR of receiving structure 272B. The generally radially opposite side of receiving structure 272B communicates with an opening 287 which extends between power block base 270B and pin holder 280B. Opening 287 between power block base 270B and pin holder 280B enables pin holder 280B to be drawn and/or otherwise moved relatively nearer power block base 270B, such as by flexing of the power block at or adjacent first radial portion 272BR.

Accordingly, in the complete assemblage of power block 146B, knob 150 can be used, by way of the threaded stem, to draw pin holder 280B a minor distance such as 0.5–5 mm toward power block base 270A by flexing of the power block at radial portion 272BR. This provides a clamping force sufficiently great to frictionally and/or clampingly hold power pin 20 in power block 146B by generally constricting the power pin receiving structure of power block 146B against at least a portion, optionally substantially all, of an outer circumferential portion of the surface of power pin 20.

In the complete assemblage of power blocks 146A, 146B, a user can choose between at least first, second, and optionally more, operative relative positions of the base 270B and the pin holder 280B based at least in part on the particular configuration of pin 20 to be used in combination with wire feeder 16. In some embodiments, such as those illustrated in FIGS. 6A, 8A, 8B, and 8C, a user can loosen knob 150 and thereby also loosen its threaded stem, which enables pin holder 280A to move from a first operative position, outwardly away from power block base 270A as guided by the threaded stem. When pin holder 280A is sufficiently distanced from power block base 270A, the user can, for example, rotatably move pin holder 280A about the threaded stem by e.g. rotating pin holder 280A by e.g. about 90 degrees of rotational travel, about 180 degrees of rotational travel, about 270 degrees of rotational travel, or another rotational travel distance as appropriate to the structure of the respective power block, and the respective pin holder.

The user can then tighten knob 150 and its threaded stem so as to secure pin holder 280A against power block base 270A in a second operative position. Thus, it is contemplated that in the first operative position receiving structure 282A is generally operatively aligned with receiving structure 272A whereby the receiving structure has a generally constant diameter bore as a receiving surface e.g. the bore is devoid of arm 285A. In the second operative position, receiving structure 284A is generally operatively aligned with receiving structure 272A and arm 285A generally extends into the receiving structure cavity whereby the diameter of the bore of the receiving structure cavity comprehends at least one step change.

Referring specifically to the embodiments of FIGS. 6B, 6C, 6D, 8D, and 8E, a user can loosen knob 150 and thereby also loosen its threaded stem, which enables pin holder plate 281 to be moved from a first operative position, outwardly away from pin holder 280B as guided, at least in part, by the threaded stem. When pin holder plate 281 is sufficiently distanced from pin holder 280B, the user can, for example, rotate the pin holder plate 281 about the threaded stem by e.g. rotating pin holder plate 281 by e.g. about 90 degrees of rotational travel, about 180 degree of rotational travel, about 270 degrees of rotational travel, or another rotational travel distance. When pin holder plate 281 is movably free, the user can insert arm 285B into a desired one of, for example, slots S1B, S2B, S3B.

The user can then tighten knob 150 and its threaded stem so as to secure pin holder plate 281 against pin holder 280B in a second operative position, e.g. between knob 150 and the outer surface of pin holder 280B, optionally a third operative position, and optionally other operative positions. As one example, it is contemplated that the first operative arm 285B is inserted into slot S2B (FIG. 6C) or S3B (FIG. 6D) and extends at least partially into and/or otherwise communicates with the receiving structure cavity. In the second operative position, arm 285B is inserted into slot S1B (FIG. 6B) and generally does not extend into the receiving structure cavity.

Accordingly and as desired, the user can change the surface characteristics of the receiving structure by, for example, changing the orientation of one or more components of power block 146A, 146B with respect to other components of power block 146A, 146B. Namely, the user can move pin holder 280A and/or pin holder plate 281 as desired to provide the receiving structure with, for example, a generally longitudinally constant diameter inner circumferential surface or a generally longitudinally changing-diameter inner circumferential surface based at least in part on the particular configuration of the particular pin 20 which is being utilized.

Figure 9A:
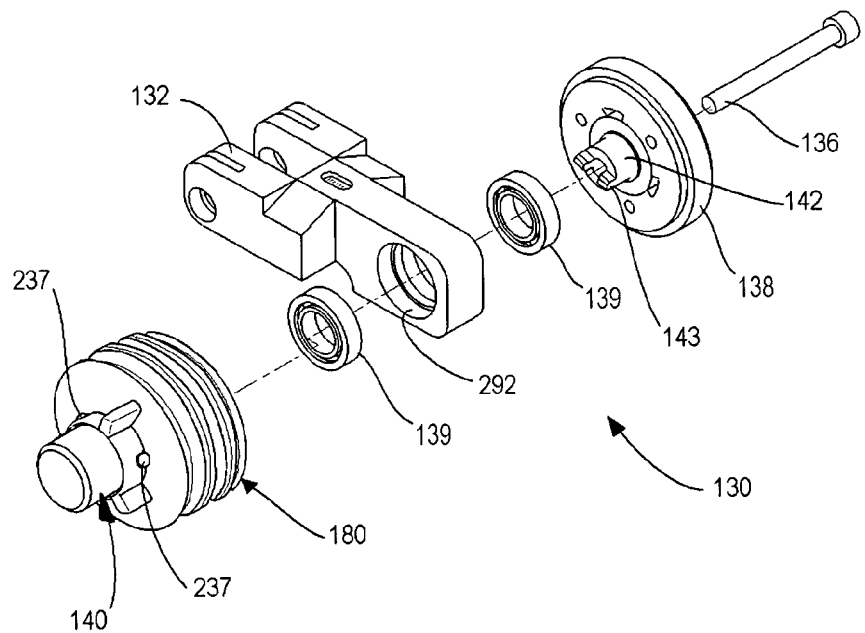
FIGS. 9A and 9B show perspective exploded views of components of the swingarm assembly illustrated in FIG. 5.

Referring now to FIG. 9A, each swingarm assembly 130 includes a swingarm 132, one of the carrier pinions 138, first and second bearings 139, and a carrier 140. A bore 292 extends through swingarm 132, the bore being sized and configured to receive the outer races of bearings 139, thus enabling the bearings 139 to be accepted into swingarm 132 by a press fit. In preferred embodiments, bore 292 includes a lip or shoulder to provide a mechanical stop, and thus separation, between respective bearings 139. Accordingly, the bearings 139 are separated from each other by a distance corresponding to a thickness dimension defined by the lip or shoulder of the bore 292.

Bolt 136 extends through the bore of carrier pinion 138 and terminates in carrier 140, generally attaching the two. As described above, carrier pinion 138 has one or more protuberances 143, and carrier 140 has corresponding interfacing receptacle structure which enables the carrier pinion 138 to be drivingly coupled to carrier 140, thus to drivingly engage carrier 140.

Swingarm assembly 130 is pivotably attached to carrier plate assembly 125 by hinge pin 129 (FIG. 5), thus enabling swingarm assembly 130 to pivot between a first generally open position, as suggested by FIG. 5 and a second generally closed position (FIG. 16). In the generally closed position, the upper carrier pinion 138, which is mounted to swingarm 132, is engaged by the corresponding lower carrier pinion 138, which is mounted to carrier plate 128 and which is driven by drive pinion 122. Thus, with the swingarm assembly positioned in the closed position, rotation of drive pinion 122 causes corresponding driving and rotation, in cooperative unison, of the upper and lower carrier pinions, and corresponding rotation of the respective drive rolls 180, which are mounted to the carriers 140, which are mounted to the respective carrier pinions 138.

Thus, the outer circumferential surface of an upper carrier pinion 138, which is mounted to swingarm 132, is adapted and configured to interface with a respective outer circumferential surface of a corresponding lower carrier pinion 138, such as by corresponding meshing teeth on respective ones of upper and lower carrier pinions 138, enabling drive pinion 122 (FIG. 5) to drive a lower carrier pinion 138 on plate 128 (FIG. 6A) which, in turn, drives the respective upper carrier pinion 138 on a respective swingarm 132.

Figure 9B:
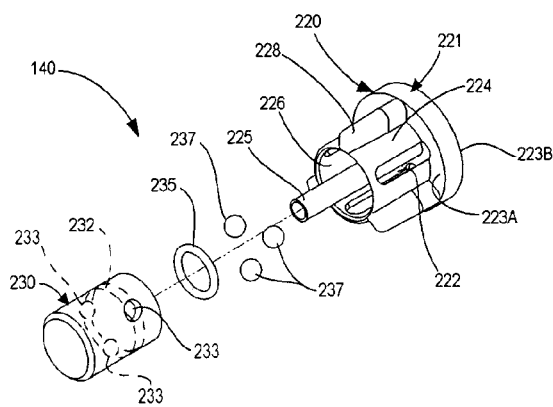

Carrier 140 as shown in detail in FIG. 9B includes, in general, body 220 and button 230. Body 220 includes base plate 221, and open-faced receptacle 224 extending away from surface 223A of the base plate. Slots 222 extend through the side wall of receptacle 224. Receptacle 224 and base plate 221 collectively define an inner cavity 226. Interface lugs 228 extend outwardly of the outer surface of the side wall of receptacle 224, and the open end of receptacle 224 is sized and configured to receive button 230 into inner cavity 226.

Compression spring 225 is received into cavity 226, and extends between base plate 221 and button 230, and biases button 230 away from base plate 221. Groove 232 is an annular depression formed in the inner circumferential surface of the side wall of button 230. Apertures 233 extend through the side wall of button 230 at groove 232, and are sized and configured to confiningly pass ball bearings 237 therethrough.

Compression ring 235 is adapted and configured to be biasingly held in groove 232 and to apply a biasing, outwardly-directed force against ball bearings 237.

Each of slots 222 in the sidewall of receptacle 224 defines an opening width dimension between the elongate side walls of each respective slot. Each ball bearing 237 has a diameter of greater magnitude than the magnitude of the width of the respective slot 222 into which the ball bearing is mounted, which prevents the respective ball bearing 237 from passing through the corresponding slot 222. Accordingly, the ball bearing 237 extends freely through the respective apertures 233, as biased by compression ring 235, and partially through the respective slot 222 but is prevented, by the limited width of slot 222, from passing entirely through the respective slot 222, thereby to hold a respective drive roll 180 onto carrier 140, as explained in more detail following.

Figure 12A:
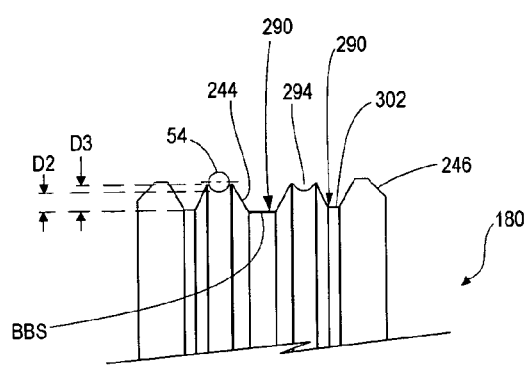
FIGS. 12A and 12B show front elevation views of portions of first and second embodiments of drive rolls of the present invention.

Referring now to FIGS. 10, 11A, 11B, 12A, 12B, and 12C, a drive roll 180 has a circular outer periphery 182 and a concentric bore 240, a first side 238, and a second side 239. Drive roll 180 has a generally circumferential outer body surface 290 wherein the magnitude of the circumference of the outer diameter varies on a traverse between the first and second sides of the drive roll. First and second elevated wire interfaces 244 extend annularly outwardly from lesser diameter base body surface portions of outer body surface 290. In some embodiments, groove 294 of the elevated wire interface 244 expresses an arcuate, e.g. semi-circular, cross-section (FIG. 12A). Such arcuate shape enables groove 294 to generally interface with the entirety of the lower portion of the surface of weld wire 54.

In other embodiments, the groove expresses an angular cross-section, optionally a V-shaped cross-section (FIG. 12B), whereby groove 294 generally supports/drives at two opposing contact points on the surface of weld wire 54, the opposing contact points being below the center-line of, and above the bottom-most surface of, weld wire 54. Typical opening cross-sections for both semi-circular and angular shaped grooves 294 include, but are not limited to, cross-sections which receive weld wire 54 having diameter of 0.03 inch, 0.035 inch, and 0.045 inch.

Preferably, each of two grooves 294 is located at a common distance D (FIG. 11A) from sides 238 and 239, respectively.

Figure 10:
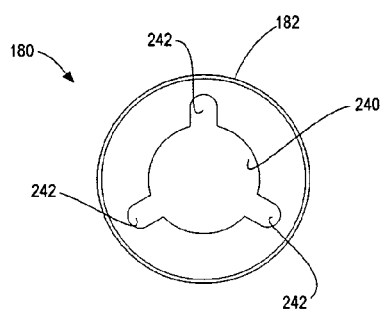
FIG. 10 shows a side elevation view of a drive roll of the present invention.
Figure 11A:
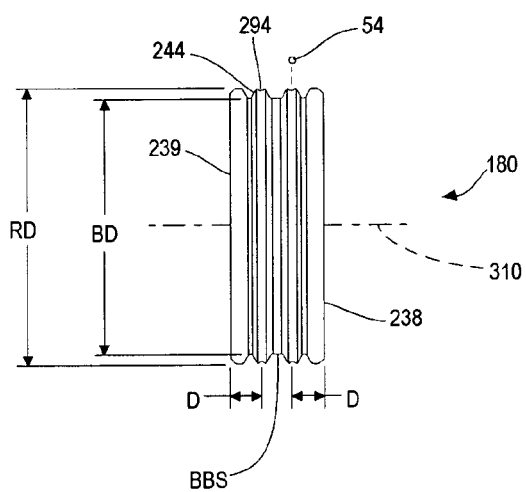
FIGS. 11A and 11B show front elevation views of first and second embodiments of drive rolls of the present invention.
Figure 11B:
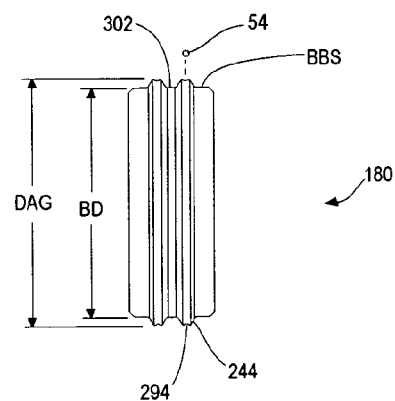

Referring to FIG. 10, three circumferentially spaced through-slots 242 extend between the first and second sides 238 and 239 of the drive roll. Each through slot 242 opens into concentric bore 240 and is sized and configured to receive a lug 228 of carrier body 220, whereby drive roll 180 is slidingly received onto carrier 140 (FIG. 9).

Circumferential outer body surface 290 of a drive roll 180 defines a base body surface BBS at dimension BD (FIGS. 11A and 11B), which base body surface supports the wire interface structure. The base body surface BBS need not be circular, and can have any of a wide range of surface configurations about the periphery of the drive roll.

Elevated wire interface 244 defines an interface diameter DAG at the circumferential tops, peaks, of grooves 294. In the illustrated embodiments, each wire interface structure 244 has first and second peaks, spaced laterally from each other, and a groove 294 therebetween; and the cross-section of the groove corresponds in general, including in magnitude, to the outer surface of the weld wire. In the arcuate embodiments of the grooves, the arc of the groove follows the arc of the wire quite closely. In the more angular, e.g. V-shaped grooves, the groove corresponds with the wire size, but deviates from the outline defined by the outer surface of the wire. Rim 246 defines a rim diameter RD at the top of rim 246.

Figure 12B:
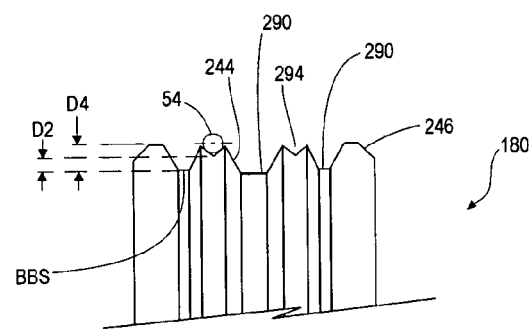

Referring to FIG. 12A, the lowest point of groove 294 is displaced outwardly from base body surface BBS by a distance D2. The outer-most portion of elevated wire interface 244, namely the top of groove 294, is displaced outwardly from base body surface BBS by a distance D3. The outer-most portion of rim 246, namely the top of rim 246, is displaced outwardly from base body surface BBS by a distance D4 (FIG. 12B). In some embodiments, the magnitude of distance D4 is greater than the magnitude of distance D3 whereby external forces directed generally at the outer body surface of the drive roll tend to impact at rims 246 in preference to grooves 294. Thus, the even slight elevation of rim 246 above the height of the tops of grooves 294 (greater diameter) operates such that rims 246 serve in a protective role with respect to grooves 294. For instance, if the drive roll is dropped onto a flat surface such as a floor, the impact is typically received at one of rims 246, whereby the grooves 294 are unaffected by such minor accidents.

Referring now to FIGS. 13A, 13B, 13C, 13D, and 13E, wire guide 250 has an elongate body which extends between first and second ends 296A, 296B respectively. A cylindrical end counter bore 257 extends from the first end axially and longitudinally into the elongate body of guide 250. Conical end counter bore 259 extends from the second, opposite end axially and longitudinally into the elongate body. Main bore 255 has a diameter which corresponds closely to the diameter of a weld wire 54 to be fed through bore 255, and extends generally the full length of guide 250 between cylindrical end bore 257 and conical end bore 259, generally centrally through the elongate body of guide 250 so as to provide lateral support to the weld wire for substantially the full length of the path of travel of the weld wire through drive assembly 56. As illustrated in FIG. 16, where bore 265 does not provide lateral support for the full circumference of the wire, namely the bore provides support only on the sides of the wire, the wire is otherwise supported on the top and bottom by the upper and lower drive rolls 180.

Cylindrical end bore 257 is adapted and configured to accept liner 19 of a welding gun 52. Conical bore 259 is adapted and configured to accept inlet guide 17 where the welding wire feeds into the drive assembly. Inlet guide 17 and liner 19 each have through bores sized to correspond to the weld wire 54 of the size for which the wire guide is designed and configured, whereby inlet guide 17, liner 19, and wire guide 250 all have generally common-size through bores which are adapted and configured to collectively provide for columnar support of the weld wire as the weld wire traverses the drive assembly.

The interfacing of liner 19 and counter bore 257 provides positional alignment and support and stabilization to guide 250 at first end 296A. Guide 250 is additionally aligned and/or supported and stabilized by inlet guide 17 at second end 296B.

Figure 17:
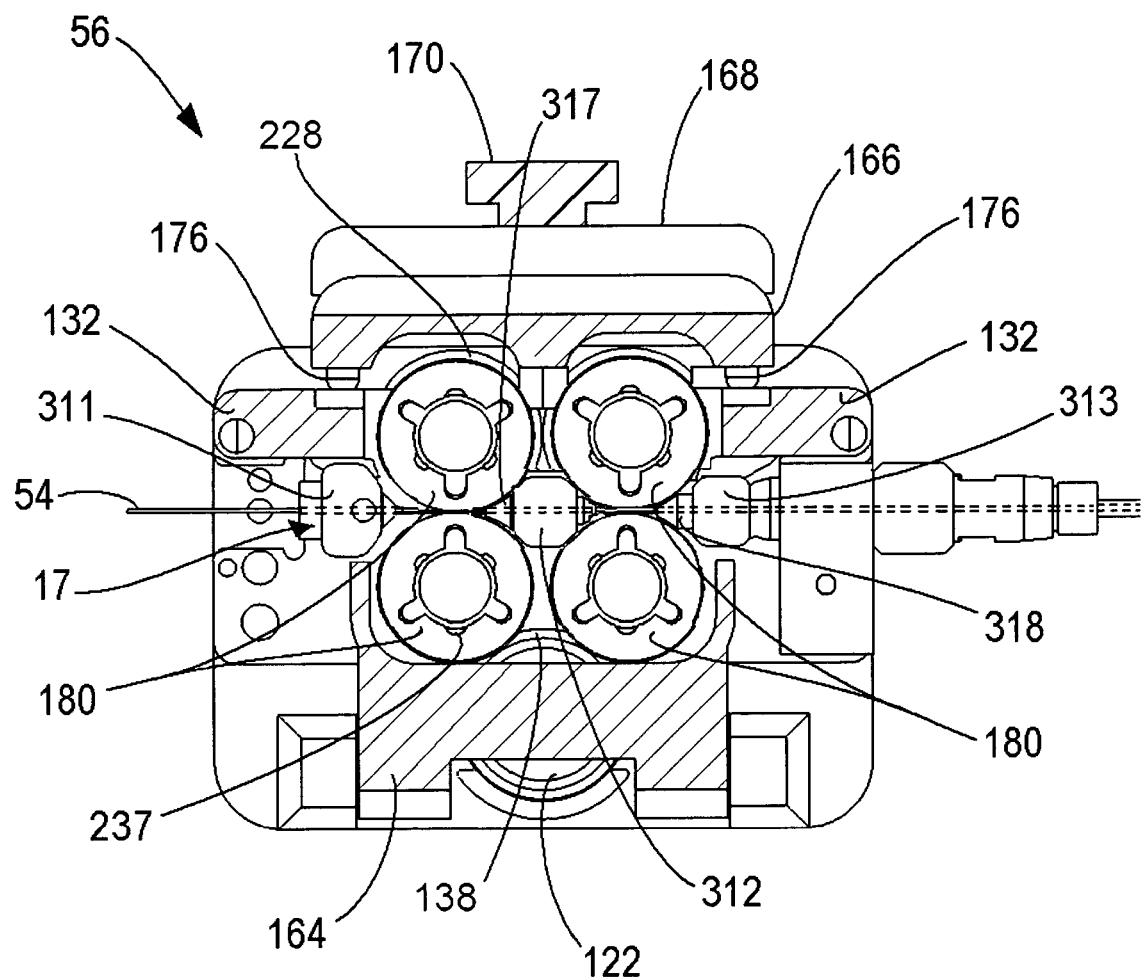
FIG. 17 shows a cross-sectional view of parts of another embodiment of a drive assembly of the present invention with the cover in the closed position.

Guide 17 is held in a relatively fixed position by the interface of o-ring 21 and a support structure, e.g. inlet guide block 311 (FIG. 17), which has an annular cavity which extends generally parallel to carrier plate assembly 125 and in line with the desired path of advance of wire 54 (FIG. 5). The annular cavity extending into inlet guide block 311 includes a lip or shoulder to provide a mechanical stop, which longitudinally holds guide 17. In alternative embodiments, wire guide 250 is generally held and positioned, in the drive assembly, only by corresponding ones of drive rolls 180 above and below wire guide 250.

Inlet guide 17 can be a separate element, an end of which is mounted into wire guide 250. In the alternative, inlet guide 17 can be an integral part of the wire guide, e.g. integrally molded as part of, or otherwise attached to, wire guide 250 whereupon O-ring 21 can communicate directly with the outer surface of the elongate body of wire guide 250, via a channel in the elongate body. Where the collar is a separate element, such O-ring channel is part of the separate collar element. In any event, inlet guide 17 includes a collar 295 which extends outwardly of the outer surface of the elongate body of wire guide 250, away from the longitudinal axis of the wire guide, at or adjacent the inlet end of the elongate body. O-ring 21 is received into a circumferentially-extending recess configured in the outer surface of inlet guide 17, e.g. a recess in the collar.

In the process of assembling the wire guide 250 to the drive assembly, the user inserts a portion of liner 19, extending from power pin 20, into cylindrical end counter bore 257 and inserts a conically tapered end of inlet guide 17 into conical end counter bore 259 which generally coaxially aligns (i) bore 255, (ii) a bore extending through liner 19, and (iii) a bore extending through inlet guide 17, with each other; thereby enabling weld wire 54 to pass through inlet guide 17, wire guide 250, and liner 19, in succession toward the welding arc, without passing though any substantial distance wherein the welding wire is unsupported along its sides. Namely, at virtually all locations between inlet guide 17 and liner 19, the wire columnar strength is supported by either bore 255, or guide 17, or liner 19, or grooves 294 of the drive rolls.

Figure 13A:
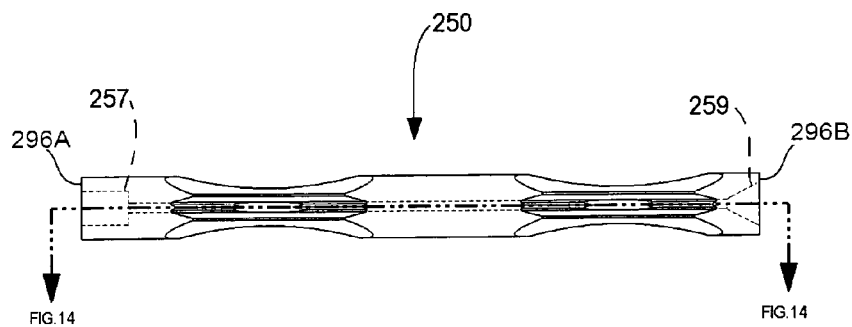
FIGS. 13A, 13B, 13C, and 13D show top and side elevation views of respective embodiments of wire guides of the present invention.
Figure 13B:
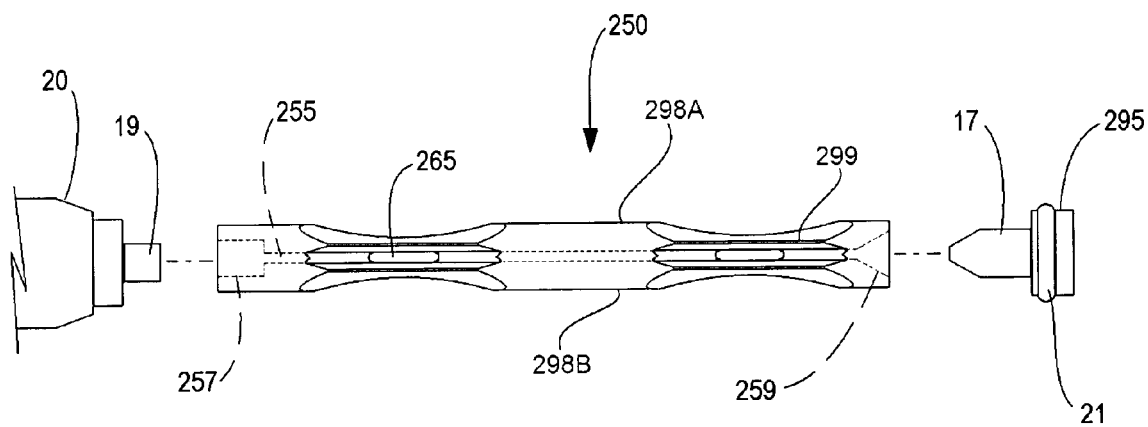
Figure 13C:
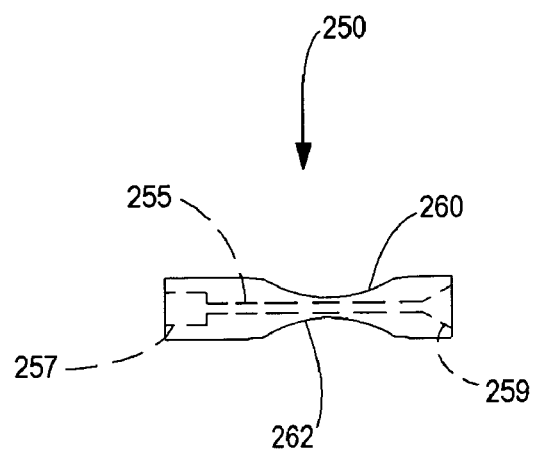
Figure 13D:
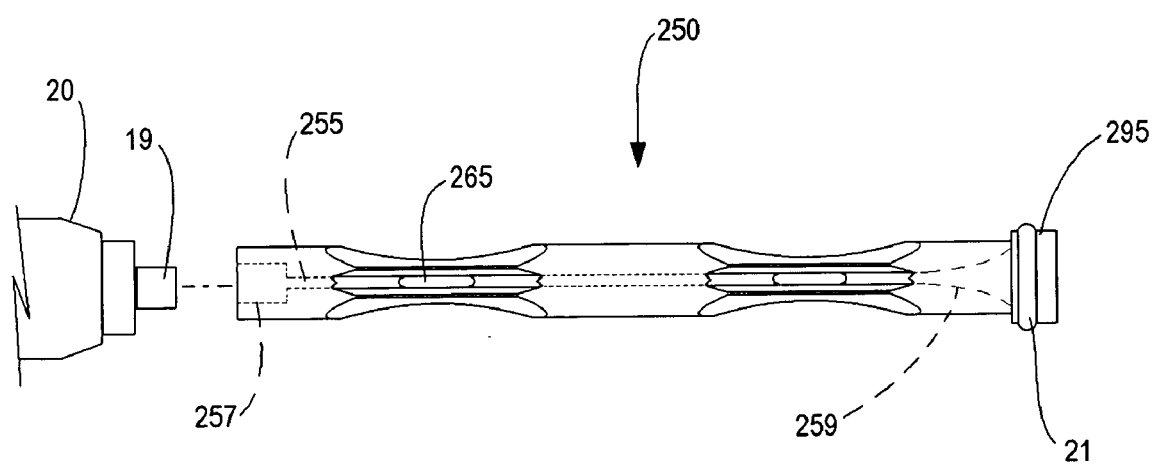
Figure 13E:
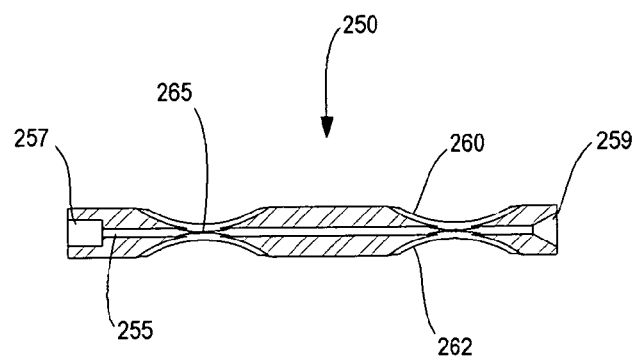
FIG. 13E shows a longitudinal cross-sectional side view of the wire guide illustrated in FIG. 13A.

Referring to FIGS. 13C and 13E, first and second diametrically opposed depressions, e.g. upper depression 260 and lower depression 262, extend inwardly from relatively top and bottom surfaces of the wire guide toward bore 255, and open into opposing sides of bore 255. The intersection of upper depression 260, lower depression 262, and bore 255 defines aperture 265 (FIGS. 13B, 13D) which extends through guide 250 from top to bottom. Typically, the width of aperture 265, across the width of the guide, is no more than three times, preferably no more than two times, the diameter of bore 255, and may be as small as substantially equal to the diameter of the bore, or any size between the diameter of the bore and three times the diameter of the bore. In some embodiments, wire guide 250 has a single pair of diametrically opposed depressions (FIG. 13C). In other embodiments, wire guide 250 has multiple pairs of diametrically opposed depressions (FIG. 13E).

Figure 12C:
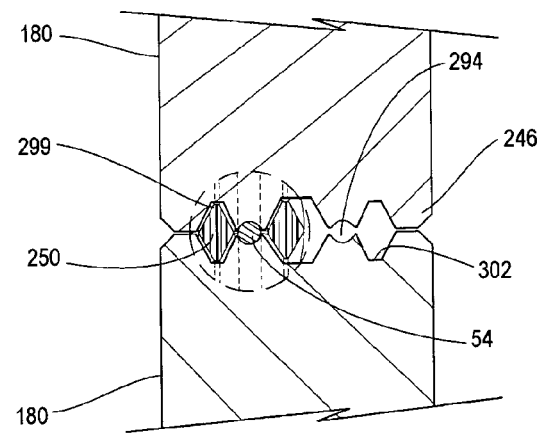
FIG. 12C shows a cross-sectional view of portions of drive rolls and a wire guide of the present invention driving a weld wire.

As illustrated in e.g. FIG. 12C, the contours and radii of upper depression 260 and lower depression 262 correspond generally to outer circumferential surface characteristics, namely outer body surface 290, of corresponding drive rolls 180 which interface with the respective depressions. In some embodiments, the thickness dimension of drive roll 180, defined by the distance between drive roll sides 238 and 239, is greater than the maximum thickness dimension of wire guide 250 between sides 298A and 298B (FIG. 13B).

Upper depression 260 and lower depression 262 can have differing contours and radii, such as when the drive roll 180 communicating with upper depression 260 and the drive roll 180 communicating with lower depression 262 have differing e.g. surface characteristics. Accordingly, wire guide 250 can have dissimilar upper depressions 260 and lower depressions 262 while still providing material between respective outer circumferential surfaces of corresponding ones of drive rolls 180, such as for example when at least one drive roll 180 has at least one channel adapted and configured to allow for guide material clearance.

In alternative embodiments, weld wire 54 is supported and or guided by a plurality of weld wire guides (FIG. 17), e.g. inlet guide 17, intermediate guide 317, and liner guide 318, each of which communicates with the outer circumferential surface of a drive roll 180. A bore extends through each of inlet guide 17, intermediate guide 317, and liner guide 318, respective ones of such bores being generally coaxial to other ones of such bores. Inlet guide 17, intermediate guide 317, and liner guide 318, are respectively housed in inlet guide block 311, intermediate guide block 312, and liner guide block 313, each of which are in turn mounted to carrier plate 128.

A bore extends through each of inlet guide block 311, intermediate guide block 312, and liner guide block 313. An annular cavity extends into each of inlet guide block 311, intermediate guide block 312, and liner guide block 313, generally concentric with each respective bore, and being generally parallel to carrier plate assembly 125 and in line with the desired path of advance of wire 54 (FIG. 5). In preferred embodiments, the annular cavity extending into each of inlet guide block 311, intermediate guide block 312, and liner guide block 313 includes a lip or shoulder adjacent the intersection of the annular cavity and the bore, providing a mechanical stop which longitudinally holds guide respective ones of inlet guide 17, intermediate guide 317, and liner guide 318.

Figure 14:
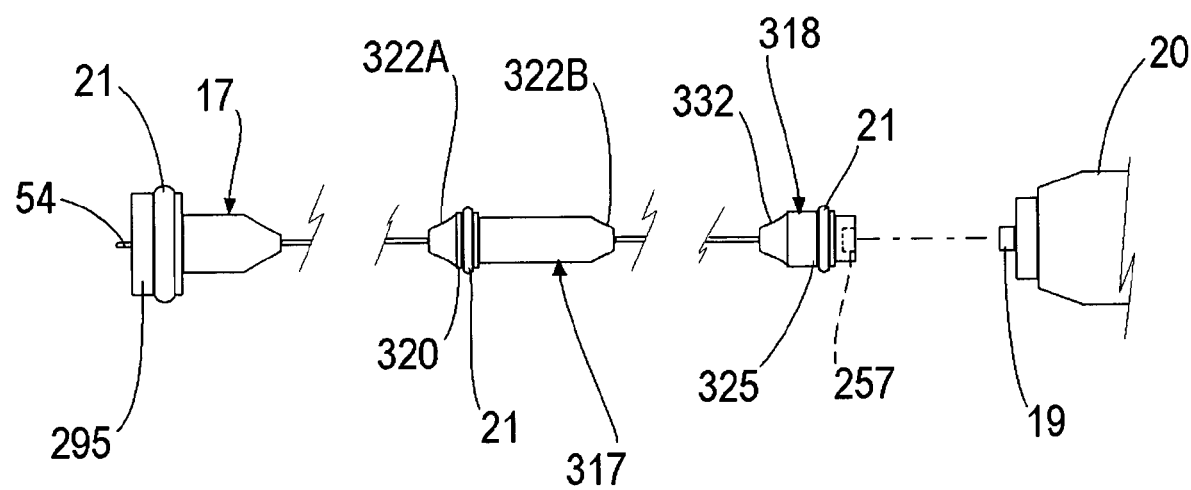
FIG. 14 shows a side elevation view of an inlet guide, an intermediate guide, and a liner guide of the present invention.

In preferred embodiments, a longitudinally outwardly facing surface of each of collars 295, 320, and 325 (FIG. 14) interfaces with the lip or shoulder in the annular cavity of respective ones of inlet guide block 311, intermediate guide block 312, and liner guide block 313, correspondingly longitudinally holding respective ones of inlet guide 17, intermediate guide 317, and liner guide 318.

Intermediate guide 317 (FIGS. 14, and 17) has a first tapered end 322A disposed toward inlet guide 17 and a second tapered end 322B disposed toward power pin 20. Each of first and second tapered ends 322A, 322B has a generally arcuate profile. The contours and radii of the generally arcuate profiles of each of first and second tapered ends 322A, 322B correspond generally to outer circumferential surface characteristics, namely outer body surface 290, of corresponding drive rolls 180 which interface with the generally arcuate profiles.

Collar 320 extends outwardly of the outer surface of intermediate guide 317, away from the longitudinal axis of the intermediate guide, between the first and seconds ends 322A, 322B. O-ring 21 is received into a circumferentially-extending recess configured in the outer surface of intermediate guide 317, e.g. a recess in the collar.

Liner guide 318 has a first, tapered end 332 disposed toward liner 17, and a second end which has a generally circular face and a generally planar profile. A cylindrical end counter bore 257 extends from the second end axially and longitudinally into the liner guide 318. Cylindrical end bore 257 is adapted and configured to accept liner 19 of a welding gun 52.

The first, tapered end 332 of liner guide 318 has a generally arcuate profile. The contours and radii of the generally arcuate profiles of tapered end 332 corresponds generally to the outer circumferential surface characteristics, namely outer body surface 290, of corresponding drive rolls 180 which interface with the respective generally arcuate profile.

Collar 320 extends outwardly of the outer surface of liner guide 318, away from the longitudinal axis of the liner guide, between the first and seconds ends. O-ring 21 is received into a circumferentially-extending recess configured in the outer surface of liner guide 318, e.g. a recess in the collar.

Figure 15:
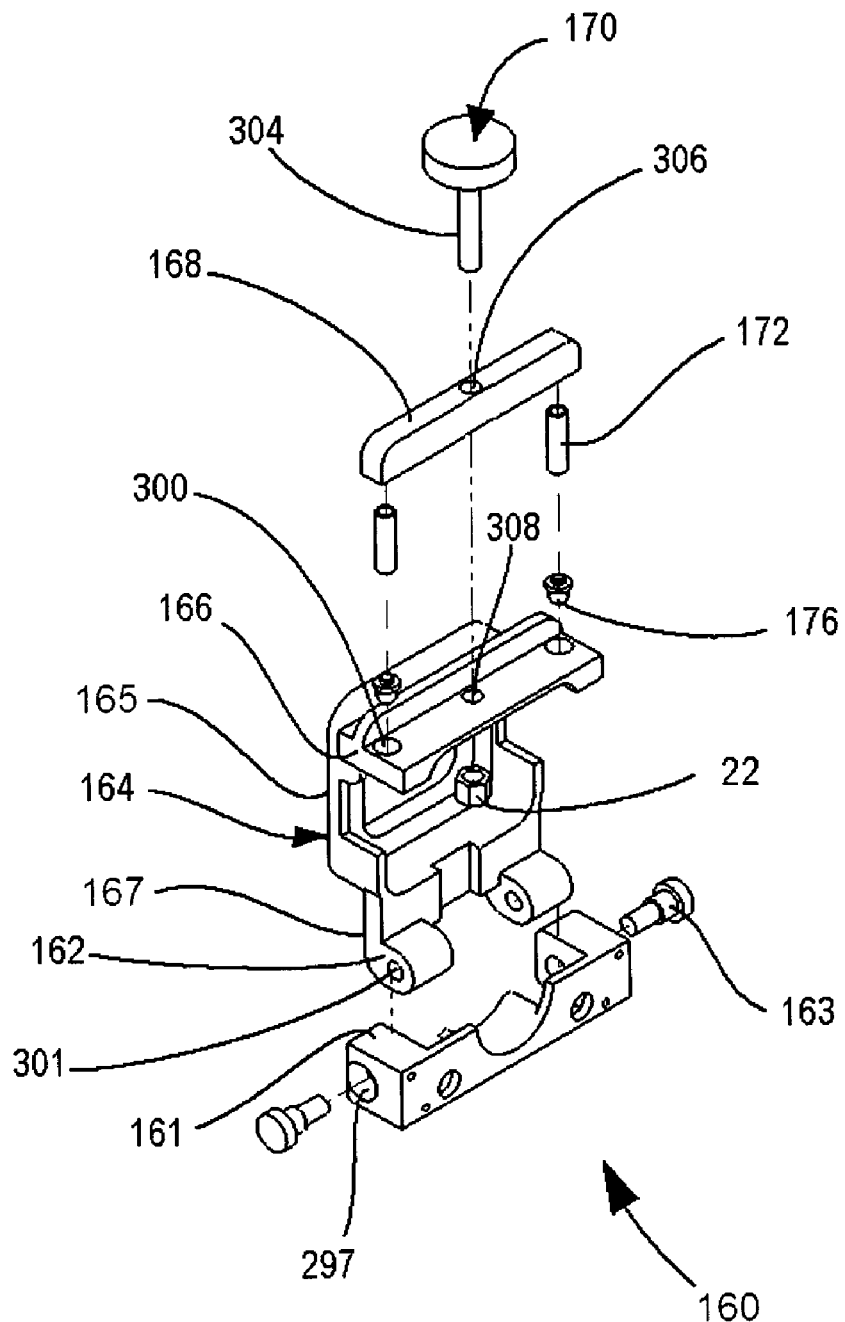
FIG. 15 shows an enlarged exploded view of the cover assembly illustrated in FIG. 5.

Referring now to FIG. 15, cover assembly 160 generally covers the internal working components of drive assembly 56. Cover assembly 160 generally includes the cover main body 164, lower bracket 161, pressure arm 168, and knob 170. Cover main body 164 includes upwardly extending side panel 165, a lower flange 167, and upper flange 166.

Lower bracket 161 is mounted to isolation plate 124 (FIG. 5) and has first and second apertures 297 on opposing ends of the bracket, axially aligned with each other. Hinge lobes 162 are located at the lower end of lower flange 167 and have apertures 301 which are axially aligned with each other and with apertures 297 in bracket 161. Pivot pins 163 extend through apertures 297 and 301, pivotably mounting cover 164 to bracket 161, and thus pivotably mounting cover 164 to isolation plate 124.

Upper flange 166 extends outwardly from side panel 165 and has first and second seats 300 (FIG. 15). Each seat comprises a relatively larger diameter blind bore into the top surface of the upper flange, and a relatively smaller diameter and concentric through-bore. Pressure arm 168 generally extends along a major portion of upper flange 166 in facing but spaced relationship with upper flange 166. First and second blind bores (not shown) extend upwardly from the lower surface of the pressure arm.

Each of the blind bores in the pressure arm receives a first terminal end of a compression spring 172. A second opposite end of the compression spring extends over and generally engages a pressure foot 176, holding the pressure foot against the bottom of the blind bore of the respective seat. Each pressure foot 176 has a projection which extends through the upper flange at the through bore and interfaces with the respective underlying swingarm 132 when cover assembly 160 is closed over the internal working elements of drive assembly 56.

The loading force of springs 172 transfers, through the projection of pressure feet 176, to the underlying swingarms 132, from the swingarms 132 to the upper drive rolls 180, and from the upper drive rolls to and through wire 54 to the lower drive rolls, thus pinching weld wire 54 between corresponding ones of the drive rolls 180 which are mounted on swingarms 132 and plate 128 respectively, above and below the respective length of the wire 54 which is engaged by the drive rolls.

Knob 170 of the cover assembly (FIG. 15) has a threaded elongate projection, e.g. a stem 304, which extends through a bore 306 in a medial section of pressure arm 168 and a bore 308 in a medial section of upper flange 166. The threaded stem of knob 170 is captured by a threaded nut 171 which is fixedly secured to upper flange 166. As an alternative, the stem can be captured by threads in the bore of upper flange 166. Adjusting the relative tightness of knob 170, e.g. rotating knob 170, correspondingly adjusts the relative load that springs 172 apply to pressure feet 176.

Springs 172 can have pre-selected spring constants and/or tensions which correspond relatively closely to the desired loading force to be applied to pressure feet 176 e.g. spring loading force, thereby reducing the amount of adjusting of the relative tightness of knob 170 to achieve the desired loading force to be applied by springs 172 to pressure feet 176. Alternatively, the spring constants and/or tensions can be pre-selected closely enough to the desired loading force to generally eliminate the need for adjusting the relative tightness of knob 170 and thereby generally reducing, alternatively eliminating, the need for knob 170. In such scenario, spring tension can be adjusted by replacing springs 172 with springs having different spring constants and/or tensions, e.g. relative greater spring tensions or relatively lesser spring tensions, as desired.

A drive assembly 56 of the present invention, with cover 164 closed over e.g. drive rolls 180, is shown in cross-sectional view in FIG. 16. Referring to FIGS. 13E and 16, corresponding pairs of drive rolls 180 interface with upper depression 260 and lower depression 262, respectively, of wire guide 250 and communicate with each other individually at apertures 265, through their collective grip on weld wire 54. Drive rolls 180 can further communicate with each other directly, at laterally displaced, facing ones of rims 246 when no wire 54 is present in groove 294. Thus, where a weld wire 54 is disposed in a groove 294, the pressure imposed by springs 172 passes through swingarm 132 such that the groove 294 in the upper drive roll 180, on the swingarm, presses against the weld wire, through aperture 265, thus applying sufficient force between the upper and lower drive rolls 180 that the driving force, applied by the rotationally-driven lower drive rolls, is effective to drive the weld wire 54 through the drive assembly, through liner 19 and to the contact tip of a gun 52. In such scenario, the lower drive roll is acting on the weld wire 54 through the same aperture 265.

Where no wire is present in a groove 294, and where the distance D4 is greater than the distance D3, the force of spring 172 brings the rim(s) 246 of an upper drive roll into contact with the corresponding rim(s) of a respective lower drive roll, such that the downward movement of swingarm 132 is stopped by the cooperating rims 246 before there is any contact between the grooves 294 in the upper and lower rolls. By thus avoiding contact between the grooves, even when no wire 54 is present, such as when the wire on a spindle 46 has run out, any potential damage to e.g. the upper edges of such grooves, top of the groove, which might occur as a result of such contact, is avoided. Here, again, rims 246 operate in a protective role to protect grooves 294 from inadvertent e.g. damage or deformation beyond the ordinary wear and tear of driving the weld wire. Rims 246 can have a planar outer surface, as illustrated in the drawings, where facing rims meet each other. In the alternative, the meeting outer surfaces of the rims can be arcuate, such that, in either case, the rims do not contact each other with sharp points which could damage either or both of the rims.

The base body surface BBS can be designed with multiple radii dimensions at the bottoms of the respective e.g. three channels 302 between grooves 294, and between grooves 294 and rims 246 (FIGS. 12B and 12C). FIG. 12C illustrates the interfacial cooperation between the side walls of channels 302 and corresponding side walls of apertures 265. As seen therein, side walls of aperture 265 are in close proximity, and are laterally adjacent the side walls of channels 302. Thus, the side walls of the channels prevent substantial lateral movement of the wire guide at the drive rolls, whereby the drive rolls stabilize the wire guide against lateral movement with respect to the drive rolls. While the drive rolls are thus configured to interface with the wire guide 250, the relative dimensions of the wire guide and the drive rolls are such that the wire guide is loosely held in place, so as to provide clearance between the drive rolls and respective portions of wire guide 250 e.g. ridges 299, without incurring so much friction between the wire guide and the drive rolls as to cause binding of the wire guide relative to the drive rolls.

As with the dimensions BD and DAG, when the base body surface comprehends multiple radii dimensions, channel to channel, the dimensions D2, D3, and D4 are then preferably measured either as diameters, or as radii from the axis of rotation 310 of drive roll 180, rather than from the base body surface at a respective channel 302.

In ordinary use of cover assembly 160, the user rotates knob 170, thus advancing the knob into the holding threads, and thereby moving pressure arm 168 toward flange 166, which increases the load that springs 172 apply through pressure feet 176 and swingarms 132, thereby increasing the pinching force that drive rolls 180 apply to weld wire 54. The user can rotate knob 170 in the opposite direction, thus to enable springs 172 to push pressure arm 168 respectively further away from flange 166, thereby decreasing the spring force being applied, and correspondingly decreasing the load that springs 172 apply through pressure feet 176 and swingarms 132, which decreases the pinching force that drive rolls 180 apply to weld wire 54.

Drive assemblies 56 of the invention are used by first determining which weld wire 54 is suitable for the welding application and subsequently selecting suitable drive rolls 180 which have e.g. grooves 294 which are compatible with the weld wire.

As desired, a user can change/replace drive rolls 180 to correspond with the current welding task. First, the user selects suitable drive rolls based, at least in part, on the type and/or size of weld wire 54 to be used in the welding process.

In an assembly wherein a drive roll 180 is assembled to e.g. a swingarm 132, or to plate 128, one of the sides 238, 239 of the drive roll is proximate, and in facing relationship with, surface 223A of base plate 221 of body 220, which is part of carrier 140. In such assembly, spring 225 is urging button 230 away from base plate 221 of body 220. At the same time, compression ring 235 is urging ball bearings 237 outwardly through apertures 233 and into confining slots 222. Accordingly, spring 225 pushes the button, and thus ball bearings, away from the base plate while compression ring 235 pushes the ball bearings into slots 222. Under that set of forces, the force of spring 225 moves button 230 outwardly, away from base plate 221, until the ball bearings reach the distal ends of slots 222, whereupon the abutment of ball bearings against the ends of the slots prevents further outwards movement of the button, whereby assembly of the drive roll of swingarm 132 or plate 128 is complete.

The distal ends of slots 222 are so positioned, relative to base plate 221, that in the fully assembled condition, wherein ball bearings 237 are abutting the distal ends of slots 222, the ball bearings 237 are positioned generally further away from base plate 221 than the respective distal side 238, 239 of the drive roll. Specifically, a respective ball bearing is abutting the distal slot end, relative to base plate 221, and is in engaging contact with, and extends a bit over, the respective side 238, 239 of the drive roll, at bore 240. Such relationships, wherein the drive roll is assembled to carrier 140, are illustrated in FIGS. 9 and 16.

Thus, ball bearings 237 serve both to limit and/or stop the outward movement of button 230 at the end of slot 222, and to hold the drive roll firmly mounted to the respective swingarm 132 on plate 128 by abutting the side 238, 239 of the drive roll. Meantime, lugs 228 on the body are received in slots 242 on the drive roll, whereby rotation of carrier 140 by the respective carrier pinion 138 causes rotation of the respective drive roll 180, thus to drive weld wire 54 when the cover assembly 160 is closed on the drive assembly.

To remove a drive roll from the drive assembly, the user presses button 230 firmly inwardly into body 220 against the collective resisting forces of spring 225 and compression spring/ring 235, plus the initial resistance imposed by ball bearings 237. Such movement of button 230 requires retraction of the extension of the ball bearings 237 over the sides 238, 239 of the drive roll. Namely, the force exerted by button 230 on the ball bearings at apertures 233 applies forces, at the contacts of the bearings with bore 240 of the drive roll, which force the bearings to move in an inward direction into the button, against the outwardly-directed force of compression ring 235. Such movement of the bearings brings the bearings 237 completely inside bore 240 such that the drive roll is released from the immobilizing force of the bearings on the drive roll. However, the force of compression ring 235 still pushes bearings 237 outwardly against the inner surface of bore 240.

Once the bearings are thus fully retracted, and are pressing against the inner surface of the bore, the outwardly-directed force of the bearings brings the bearings into modest frictional engagement with the inner surface of bore 240. Thus, any movement of the bearings along the line of direction of movement of the button 230 applies a corresponding modest force, in the same direction to the drive roll.

As the button is pushed inwardly, toward base plate 221, the drive roll cannot move because of being adjacent base plate 221. However, once button 230 is released, and begins moving back away from base plate 221, under the restorative force of spring 225, compression ring 235 continues to bias ball bearings 237 against the inner surface of bore 240. The frictional forces between ball bearings 237 and the inner surface of bore 240 are sufficiently great that drive roll 180 is carried outwardly away from base plate 221 with button 230, whereupon the drive roll is delivered for facile removal removed from carrier 140.

Thus, pressing and releasing button 230 both releases the drive roll, and moves the drive roll outwardly on carrier 140, for facile removal by the user.

To install a suitable drive roll 180, the user aligns through slots 242 of a drive roll 180 with corresponding lugs 228 of a carrier 140. The user then pushes the drive roll onto the carrier. As the drive roll is pushed onto the carrier body 220, the respective side 238, 239, at bore 240 pushes against the ball bearings 237 in slots 222, thus pushing the ball bearings toward base plate 221, carrying button 230 along. When the proximal edge of button 230 abuts 221, the button stops moving. Upon further pushing of the drive roll toward base plate 221, the respective side 238, 239 of the drive roll, at bore 240, pushes the ball bearings inwardly against compression ring 235, whereupon the drive roll advances into close proximity to surface 223A of the base plate, while bearings 237 are pressed against the inner surface of bore 240 by compression spring/ring 235.

In that condition, the retractive force of spring 225 is sufficient to move the button, and ball bearings 237 with it, away from base plate 221, whereby ball bearings 237 move outward along slots 222 until the bearings abut the distal ends of the slots. In that condition, the bearings are disposed generally outwardly of the drive roll, as indicated above, and also extend a bit over the respective sides of the drive roll, thereby capturing the drive roll between the bearings and the base plate.

The user then adjusts drive roll pressure by turning, e.g. tightening or loosening knob 170. Preferably, the user adjusts drive roll pressure to a pressure level which applies sufficient pressure to drive weld wire 54 through the wire feeder assembly 16 without undesired levels of wire slippage, while not applying so much pressure that drive rolls 180 unnecessarily deform weld wire 54.

Preferably, drive assembly 56 is made of materials which resist corrosion, and are suitably strong and durable for normal extended use. Those skilled in the art are well aware of certain metallic and non-metallic materials which possess such desirable qualities, and appropriate methods of forming such materials.

Appropriate metallic materials for components of drive assembly 56 include, but are not limited to, aluminum, steel, stainless steel, titanium, magnesium, brass, and their respective alloys. Common industry methods of forming such metallic materials include casting, forging, shearing, bending, machining, riveting, welding, powdered metal processing, extruding and others.

Non-metallic materials suitable for components of drive assembly 56, e.g. inlet guide 17, isolation plate 124, spacer blocks 126, parts of knobs 150 and 170, wire guide 250, and others, are various polymeric compounds, such as for example and without limitation, various of the polyolefins, such as a variety of the polyethylenes, e.g. high density polyethylene, or polypropylenes. There can also be mentioned as examples such polymers as polyvinyl chloride and chlorinated polyvinyl chloride copolymers, various of the polyamides, polycarbonates, and others.

For any polymeric material employed in structures of the invention, any conventional additive package can be included such as, for example and without limitation, slip agents, anti-block agents, release agents, anti-oxidants, fillers, and plasticizers, to control e.g. processing of the polymeric material as well as to stabilize and/or otherwise control the properties of the finished processed product, also to control hardness, bending resistance, and the like.

Common industry methods of forming such polymeric compounds will suffice to form non-metallic components of drive assembly 56. Exemplary, but not limiting, of such processes are the various commonly-known plastics converting processes.

Drive assembly 56 is preferably manufactured as individual components, and the individual components assembled as sub-assemblies, including but not limited to motor 102 and components attached thereto e.g. gearbox 112, drive pinion 122, and isolation plate 124; carrier plate assembly 125; swingarm assemblies 130; and cover assembly 160. Each of the aforementioned sub-assemblies is then assembled to respective other ones of the sub-assemblies to develop drive assembly 56. Those skilled in the art are well aware of certain joinder technologies and hardware suitable for the assembly of drive assembly 56.

Finally, in preferred embodiments, the modularity of drive assembly 56, and the structure of each of its components, facilitate manufacture, service and repair of the drive assembly. In preferred embodiments, isolation plate 124, carrier assembly 125, swingarm assemblies 130, and cover assembly 160 are symmetrical, making them suitable for installation as components of drive assembly 56 whether mounted to, e.g. either a left or a right side of control box 48 (FIG. 1).

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A welding gun power block for holding a welding gun power pin, said power block comprising:
    (a) a welding gun power block base;
    (b) a welding gun power pin holder;
    said power block base and said power pin holder collectively defining a bore extending through said power block, and
    (c) a sliding arm movable between at least a first position and a second position
    said sliding arm, in the first position extending at least partially into said bore and said sliding arm in the second position, generally not extending into said bore.

2. A welding gun power block as in claim 1 wherein said sliding arm extends from said power pin holder.

3. A welding power block as in claim 1 wherein said sliding arm extends from said power block base.

4. A welding gun power block as in claim 1 wherein said sliding arm defines a generally planar interface surface adapted and configured to interface with such welding gun power pin.

5. A welding gun power block as in claim 1 wherein said sliding arm defines a generally arcuate interface surface adapted and configured to interface with such welding gun power pin.

6. A welding gun power block as in claim 1 wherein said sliding arm is rotatably movable between at least a first position and a second position.

7. A welding system comprising a wire feeder apparatus having a power block as in claim 1.

8. A welding gun power block for holding a welding gun power pin, said welding gun power block comprising:
    (a) a welding gun power block base; and
    (b) a power pin holder mounted to said power block base, and pivotably movable between at least a first position and a second different position;
    said power block base and said power pin holder collectively defining a bore extending through said power block, said bore having an inwardly-facing bore surface, wherein, when said power pin is in said first position, a respective inwardly-facing bore surface extends axially of the bore along a generally smooth and continuous path of advance, and when said power pin holder is in said second position, the respective inwardly-facing bore surface extends axially of the bore along a path containing at least one step discontinuity in path direction.

9. A welding gun power block as in claim 8 wherein said power pin holder is rotatably movable between at least a first position and a second position.

10. A welding gun power block as in claim 8 wherein said power pin holder comprises a power pin holder plate which is movable between at least a first position and a second position.

11. A welding gun power block as in claim 10 wherein said power pin holder plate is rotatably movable between at least a first position and a second position.

12. A welding system comprising a wire feeder apparatus having a welding gun power block as in claim 8.

13. A welding gun power block for holding a welding gun power pin, said welding gun power block comprising:
    (a) a power block base having a first receiving structure extending thereinto; and
    (b) a power pin holder having a second receiving structure extending thereinto;
    said power block base and said power pin holder collectively defining a bore extending through said welding gun power block, said bore having an inwardly-facing bore surface, at least one of said first receiving structure and said second receiving structure having a projection extending therefrom or a depression extending thereinto,
    whereby, when said first and second receiving structures are aligned with each other, a respective inwardly-facing bore surface extends axially of the bore along a path containing at least one discontinuity in a path direction.

14. A welding gun power block as in claim 13 wherein each of said first and second receiving structures comprises at least one projection extending therefrom or at least one depression extending thereinto.

15. A welding gun power block as in claim 13 wherein a receiving structure surface, bearing such discontinuity, is defined by a said projection removably extending into at least one of said first and second receiving structures.

16. A welding gun power block as in claim 13, wherein said projection comprises a sliding arm having a generally straight-line distal edge and removably extending into said bore through at least one of said first and second receiving structures.

17. A welding gun power block as in claim 13, wherein said projection comprises a sliding arm having a generally arcuate distal edge thereby to cooperate with an arcuate outer surface of such welding gun power pin, and removably extending into said bore through at least one of said first and second receiving structures.

18. A welding system comprising a wire feeder apparatus having a welding gun power block as in claim 13.

19. A welding gun power block for holding a welding gun power pin, said welding gun power block comprising:
    (a) a welding gun power block base; and
    (b) a welding gun power pin holder having a power pin plate, said power pin plate having a main body, and a sliding arm extending therefrom, said power block base and said power pin holder, collectively, defining a power pin bore extending through said power block,
    said sliding arm communicating with at least one of said power block base and said power pin holder, and thereby extending into the power pin bore in said power block.

20. A welding gun power block as in claim 19, said power pin plate being movable between at least a first position and a second position.

21. A welding gun power block as in claim 20 wherein, when said power pin plate is in the first position, said sliding arm of said power pin plate generally extends into the power pin bore.

22. A welding gun power block as in claim 20 wherein, when said power pin plate is in the second position, said sliding arm of said power pin plate generally does not extend into the power pin bore.

23. A welding gun power block as in claim 19, said sliding arm having a generally straight line distal edge.

24. A welding gun power block as in claim 19, said sliding arm having a generally arcuate distal edge.

25. A welding system comprising a wire feeder apparatus having a welding gun power block as in claim 19.

* * * * *